Jan. 26, 1965    J. M. MALJANIAN ETAL    3,166,902
FUEL CONTROL FOR A REGENERATIVE GAS TURBINE ENGINE
Filed Nov. 15, 1962    6 Sheets-Sheet 2

INVENTORS
JOHN M. MALJANIAN
GENE A. MEYER
BY *(signature)*
ATTORNEY

Jan. 26, 1965  J. M. MALJANIAN ETAL  3,166,902
FUEL CONTROL FOR A REGENERATIVE GAS TURBINE ENGINE
Filed Nov. 15, 1962  6 Sheets-Sheet 3

FIG_3

INVENTORS
JOHN M. MALJANIAN
GENE A. MEYER
BY Arm Prentiss
ATTORNEY

INVENTORS
JOHN M. MALJANIAN
GENE A. MEYER
BY
ATTORNEY

Jan. 26, 1965  J. M. MALJANIAN ETAL  3,166,902
FUEL CONTROL FOR A REGENERATIVE GAS TURBINE ENGINE
Filed Nov. 15, 1962  6 Sheets-Sheet 5

INVENTORS
JOHN M. MALJANIAN
GENE A. MEYER
BY
ATTORNEY

Jan. 26, 1965    J. M. MALJANIAN ETAL    3,166,902
FUEL CONTROL FOR A REGENERATIVE GAS TURBINE ENGINE
Filed Nov. 15, 1962    6 Sheets-Sheet 6

INVENTORS
JOHN M. MALJANIAN
GENE A. MEYER
BY
ATTORNEY

United States Patent Office 3,166,902
Patented Jan. 26, 1965

3,166,902
FUEL CONTROL FOR A REGENERATIVE GAS
TURBINE ENGINE
John M. Maljanian, Newington, and Gene A. Meyer,
Simsbury, Conn., assignors to Chandler Evans Corporation, Hartford, Conn., a corporation of Delaware
Filed Nov. 15, 1962, Ser. No. 237,914
31 Claims. (Cl. 60—39.16)

This invention pertains to a fuel control system for operation of complex, multiple cycle, twin-spool, gas turbine engines which produce low specific fuel consumptions of orders of magnitude that are comparable to compression ignition type (diesel) engines; and more particularly has reference to such engines in which there is incorporated a heat exchanger that may be of a recuperative or regenerative type, for which corrections are made in the scheduled fuel flow to the engine, to compensate for the heat added to the fuel by the heat exchanger, in order to prevent engine surge and/or overtemperatures.

As with all gas turbine engines, fuel is scheduled in such a manner as to prevent engine surge and/or overtemperature, which cause loss of performance and possible structural damage. Turbine overtemperature causes damage by exceeding the temperature capability of its materials which results in shorter engine life and possibly destruction of the engine during operation.

The required steady state operating fuel flow to the engine varies as a function of engine inlet temperature, altitude, compressor pressure ratio, engine speed, and engine inlet ram conditions; which entities constitute the control parameters that determine the fuel flow to the engine.

Acceleration fuel flow is scheduled to provide fast accelerations from one operating speed to another, as well as rapid decelerations where the power demand is varied from one speed setting to another. These changes in speed setting which produce a corresponding change in power output must be accomplished without causing engine surge, overtemperature, or any other conditions which, as a result of fuel flow variance from acceptable limits, could cause damage to the engine.

The general problem associated with the control of gas turbine engines with heat exchangers is the adjustment in fuel flow to the engine which is required as a result of conditions brought about by the recuperator, since heat added from the recuperative or regenerative type heat exchanger (hereinafter referred to simply as the recuperator) must be compensated for by a corresponding correction in fuel flow.

Accordingly, one of the primary objects of our invention is to provide a fuel and speed control system having means for making the necessary correction in fuel flow to the engine by sensing the temperature of the recuperator and correcting the fuel flow in the fuel control as a function of this temperature.

Due to the complex cycle of the engine being controlled, it is important that the ratio of selected corrected speeds of the two component spools (i.e. high and low pressure compressor rotors) be maintained at a definite value for each particular selected position of the engine power control lever. Since no mechanical drive is available as a measure of low pressure rotor speed, the low pressure compressor discharge pressure is used as a measure of this speed. High pressure speed is mechanically available and is used directly.

Accordingly, another primary object of our invention is to provide a fuel and speed control system having means for maintaining the ratio of selected corrected speeds of the high and low pressure compressor rotors at a definite value, for each particular selected position of the engine power control lever. More specifically, for each power lever position, a given value of high pressure rotor speed is selected, along with a corresponding steady state discharge pressure ($P_2$) of the low pressure compressor. Automatic compressor inlet temperature ($T_1$) correction adjusts the absolute values of these settings for the particular $T_1$ condition, to provide the necessary steady state settings which achieve optimum fuel consumption rates, at optimum conditions of the recuperator, without compressor surge and turbine overtemperature.

Still another object of our invention is to provide a fuel and speed control in which the torque output of the free power turbine of the engine is controlled by controlling the "corrected" speed ($N_2/\sqrt{T_1}$) of the high pressure compressor rotor, so that the torque exerted by the power turbine is independent of the temperature ($T_1$) of the air entering the engine, as shown later in this specification.

Other objects of our invention are to provide a fuel and speed control system embodying the following novel features:

(1) A fuel control apparatus which is contained in a single, unitary control package, with single lever for operation under all conditions of environment, speed altitude, etc.

(2) Means to provide for automatic starting of the engine.

(3) Means to automatically provide for maximum acceleration of the engine from one power lever setting to another, without causing engine (compressor) surge and/or engine overtemperature.

(4) Means to provide steady state operation of the engine, with automatic compensation for variation in engine inlet conditions of temperature and pressure (altitude); and also changes of conditions in the recuperator.

(5) Means to automatically provide for maximum deceleration of the engine from any given power lever setting to any lower power lever setting, without causing burner blowout.

(6) Means to provide automatic temperature compensation for high pressure rotor load torque, since provision can be made on the engine for extraction of power from the high pressure rotor.

(7) A control system which is adaptable to gas turbines for either airborne or ground vehicles (trucks, tanks) or power stations (generator set, etc.). However, due to weight and size problems associated with the aircraft engine, the engines equipped with recuperators (heat exchangers) would be more suitable to the ground applications—although the principles of control of our invention also apply to engines which could be used in aircraft.

Further objects of our invention are to provide an improved fuel and speed control apparatus for a twin-spool engine, equipped with a recuperator, which embodies the following noval features:

(8) A control apparatus comprising, in a single self-contained package, a primary fuel supply and control system, and a secondary fuel supply and control system which supplements the primary system; each system comprising a series of component coordinated hydraulic devices for regulating fuel delivery to the engine; said devices being collectively responsive to the control parameters specified hereinbelow, and subject to a single manual control power lever.

(9) A control apparatus which comprises a series of devices that measure inlet air absolute temperature, high pressure compressor discharge pressure, recuperator temperature, and engine speed (r.p.m.), and positions a primary fuel metering valve in accordance with a preselected composite function of said temperature, said pressure and speed; while the pressure differential (metering head) across said valve is maintained at a constant selected value.

(10) A fully automatic hydraulic control apparatus in which the primary fuel flow to the engine is compensated for variations in absolute inlet air temperature, high pressure compressor discharge pressure, recuperator temperature, and engine speed; and said compensation being inherent in the operation of the apparatus, so that additional correction factors for these variables are not required, in order to compensate for variations in operating conditions due to said variables.

(11) A fully automatic, hydraulic control apparatus which uses as control "parameters," for limiting the maximum fuel flow to the engine, the quantities "corrected speed" and "corrected fuel flow," as defined hereinbelow.

(12) A control apparatus which produces a substantially corrected constant engine speed, $(N_2/\sqrt{T_1})$ corresponding to any selected position of a single manual control lever, under all engine operating conditions.

(13) A control apparatus which functions so that the engine can be accelerated at a maximum rate, corresponding to the temperature of the air entering the engine (low-pressure compressor), without causing compressor stall and decelerated at a maximum rate without causing burner blowout.

(14) A control apparatus wherein the fuel flow regulating mechanism operates in its own fluid (which may be either an oil or engine fuel), and acts directly on the fuel supplied by a constant delivery pump and regulates its flow to the engine by means of a plurality of suitable control valves.

(15) A control apparatus having override speeds and temperature control devices which prevent the engine from operating at excessive speeds and temperatures.

With these and other objects in view of which may be incident to our improvements, our invention consists in the combination and arrangement of elements hereinafter described and illustrated in the accompanying drawings, in which FIG. 1 is a schematic diagram of our improved fuel supply and control system as applied to a twin spool turbine engine having an incorporated recuperator.

Figure 1:
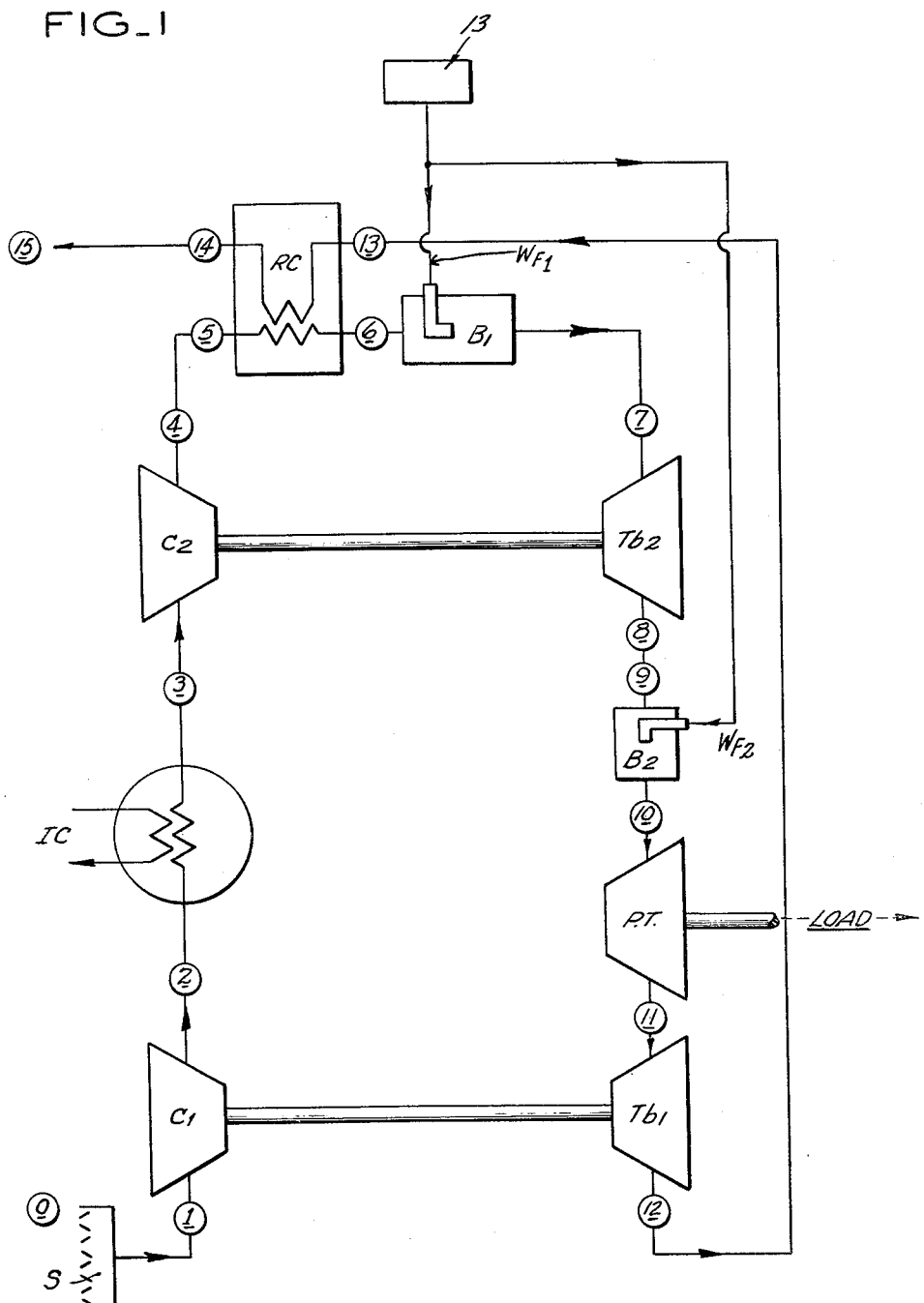

As shown in FIG. 1, the engine, to which our improved fuel supply and control system is applied, comprises a low-pressure air compressor $C_1$, driven by a secondary gas turbine $T_{b_1}$, arranged in air flow series relation to a high-pressure compressor $C_2$, driven by a primary gas turbine $T_{b_2}$. The rotor of the low-pressure compressor $C_1$, directly connected to the rotor of auxiliary turbine $T_{b_1}$; and the rotor of the high-pressure compressor $C_2$, directly connected to the primary turbine $T_{b_2}$; constitute respectively the outer and inner spools of the engine.

A free power gas turbine PT, interposed in fluid flow series relation between the primary turbine $T_{b_2}$ and the secondary turbine $T_{b_1}$, generates the power output of the engine which may be used to propel a ground vehicle (i.e., truck or tank), or to rotate an aircraft propeller.

Figure 2:
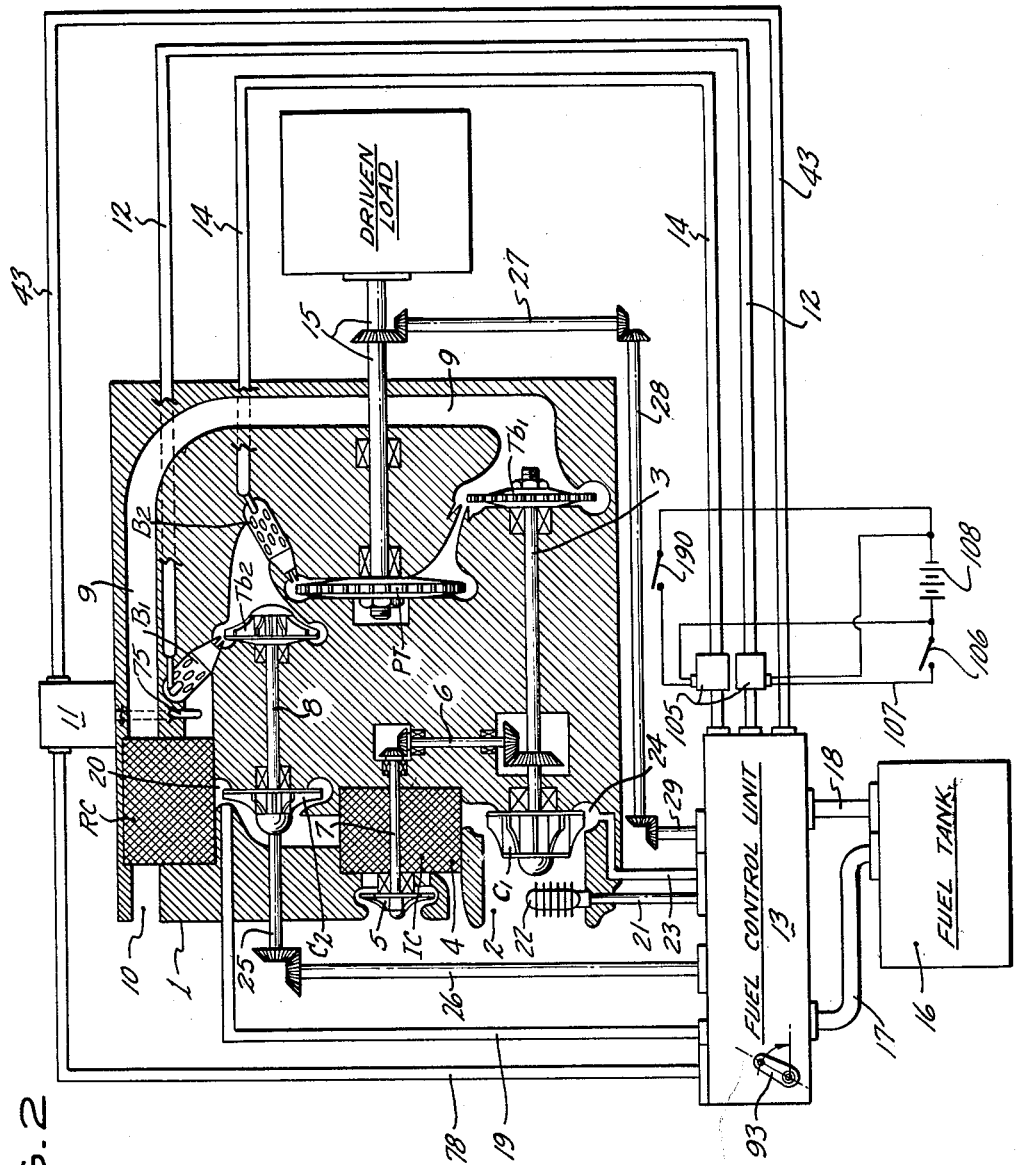
FIG. 2 is a diagrammatic section of the engine of FIG. 1, showing the connections between the engine and other elements of the fuel supply and control system of our invention.
Figure 3:
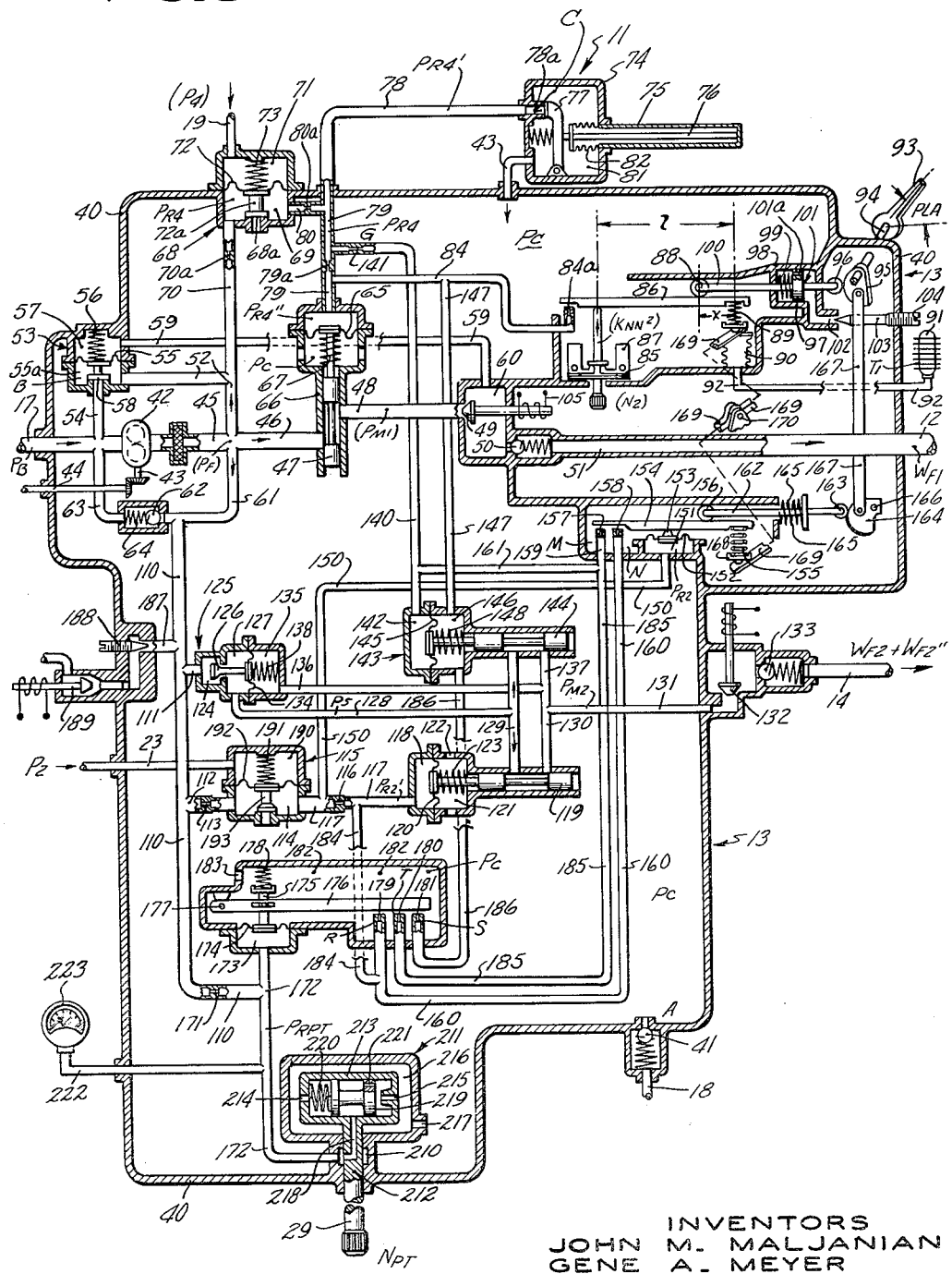
FIG. 3 is a schematic sectional view of a fuel and speed control apparatus embodying the principles and novel features of our invention.

A primary combustion chamber $B_1$, interposed in fluid flow series relation between the high-pressure compressor $C_2$ and the primary turbine $T_{b_2}$, receives compressed air from compressor $C_2$, and is supplied with fuel (oil), at a flow rate $W_{F_1}$, from the fuel control unit shown in FIGS. 2 and 3. The gases generated by the combustion of fuel in chamber $B_1$ flow through primary turbine $T_{b_2}$ to a secondary combustion chamber $B_2$, to which additional fuel is supplied, at a rate $W_{F_2}$, from the fuel control unit shown in FIGS. 2 and 3. The gases, generated by the combustion of fuel in chamber $B_2$, augment the gases flowing into said chamber from turbine $T_{b_2}$, and both flow though the free power turbine PT and the secondary turbine $T_{b_1}$ to a recuperator RC, from which they are exhausted into the outside air. Compressed air flowing from compressor $C_2$ to primary combustion chamber $B_1$ also passes through the recuperator RC where it receives heat from the exhaust gases flowing therethrough.

Interposed in air flow series relation between low-pressure compressor $C_1$ and high-pressure compressor $C_2$, is an intercooler IC, which receives cooling fluid from a source (not shown), and cools the air flowing from compressor $C_1$ to compressor $C_2$.

Air enters the engine from the circumambient atmosphere (station 0) through air flow silencer S and flows successively through compressor $C_1$, intercooler IC, compressor $C_2$, recuperator RC, to primary combustion chamber $B_1$; and the gases generated in chamber $B_1$ flow through primary turbine $T_{b_2}$ to secondary combustion chamber, where they are augmented by the gases generated in chamber $B_2$; and both then flow successively through power turbine PT, auxiliary turbine $T_{b_1}$, and recuperator RC, from which they are exhausted into the circumambient atmosphere.

The underscored numerals 0 to 15 indicate the successive stations in the fluid flow path from air inlet station 0 to exhaust gas outlet station 15—as clearly indicated in FIG. 1.

Broadly comprehended, the fuel supply and control system of our invention, as herein disclosed, comprises the concept of a hydromechanical fuel metering system which schedules both primary and secondary engine metered fuel flow in accordance with requirements for satisfactory engine operation.

The inputs (i.e. control parameters) of our control system are:

(1) High-pressure rotor speed, $N_2$.
(2) Low-pressure compressor pressure, $P_2$.
(3) High-pressure compressor pressure, $P_4$.
(4) Compressor inlet temperature, $T_1$.
(5) Combustor inlet (recuperator) temperature, $T_6$.
(6) Power turbine speed, $N_{PT}$.
(7) Power lever angle, PLA.
(8) Primary fuel flow to the engine, $W_{F_1}$.
(9) Secondary fuel flow to the engine, $W_{F_2}$.

The outputs (i.e. controlled entities) of our control system are:

(1) Primary fuel flow $W_{F_1}$, regulation in accordance with engine performance requirements.
(2) Secondary (or reheater fuel flow), $W_{F_2}$, regulation in accordance with engine performance requirements.
(3) Secondary augmentation fuel flow, $W_{F_2'}$, regulation in accordance with engine performance requirements.

In general, the primary acceleration fuel flow is scheduled in accordance with high-pressure compressor discharge pressure, $P_4$, as biased by recuperator temperature, $T_6$. High-pressure compressor speed, $N_2$, is controlled as a function of power lever angle, PLA, with compressor inlet temperature, $T_1$, correction to maintain corrected speed settings.

Secondary or reheater acceleration fuel flow, $W_{F_2}$, is scheduled in accordance with low-pressure compressor pressure, $P_2$. Low-pressure spool speed is maintained by controlling $P_2$ pressure as a function of set power lever angle, PLA. As with speed, $N_2$, set values of pressure, $P_2$, are corrected or reset with $T_1$ temperature, to maintain essentially corrected $N_1$ speed settings (since $P_2$ is a measure of $N_1$, or low-pressure rotor speed).

The selected power lever angle, PLA, sets required corresponding values of both speed $N_2$ and pressure $P_2$ simultaneously, the $T_1$ temperature correction being automatically applied to both settings by a $T_1$ transducer. An adjustable hydraulic dashpot is provided on the throttle shaft between the $P_2$ and $N_2$ setting to delay return of the $N_2$ setting in the deceleration direction, and thus prevent low-pressure compressor surge during decelerations. The dashpot is ineffective during increased settings of the power lever.

As is required by desired engine performance, secondary fuel flow $W_{F_2}$ is augmented by an increment of fuel flow $W_{F_2'}$, which is proportional to the amount which the $N_2$ governor has cut in, or a fixed value, whichever is the least.

The power turbine (PT) governor generates a pressure signal (OS) as a function of power turbine speed, $N_{PT}$. At power turbine cut-in speed, this pressure acts to reduce both primary and secondary fuel flow as a function of power turbine speed error to effectively serve the same function as retarding the throttle. The pressure generating system is a part of the main control. Overspeed signal (OS) is available in the form of the generated pressure. A pressure switch (not shown), set for the pressure corresponding to the shutdown speed, supplies an electrical signal for shutting down the engine if required.

As shown in FIG. 3 the fuel and speed control package contains the following main elements:

(i) Positive displacement fuel pump integral with the control package;

(ii) Primary fuel metering and speed control system for the high pressure rotor;

(iii) Secondary fuel metering system and compressor discharge pressure control system for the low-pressure rotor;

(iv) Single power lever mechanism to set the prescribed combination of high-pressure rotor speed and low-pressure rotor pressure;

(v) Power turbine governor to reduce both primary and secondary fuel flow to the engine as a function of power turbine speed error.

(vi) Modification of fuel flow with variations of recuperator gas temperature, so that the primary acceleration fuel flow will be proportional to the product of a function of high-pressure compressor discharge pressure ($P_4$) and a function of recuperator temperature ($T_6$).

(vii) Compressor inlet temperature biasing of the high-pressure rotor speed selector, so that the selected speed is essentially a "corrected" speed ($N_2/\sqrt{T_1}$).

(viii) Time delay on deceleration of the high pressure rotor.

(ix) Compressor inlet temperature biasing of the low-pressure rotor pressure selector.

The "two-spool" engine with which our invention operates requires two separate but cooperating fuel control systems, one for each of the two rotors. Each system must provide independent means for transient and steady state control of the rotor with which it is associated, together with certain additional coordinating functions.

The engine with which our invention operates is also distinguished from conventional aircraft gas turbines by the presence of a recuperator, which introduces a special problem into the construction and functioning of the control; in that the control must modify the maximum limiting, or acceleration, fuel schedule to compensate for the heat recovered from the recuperator; and this is accomplished by regulating the primary fuel flow in accordance with the equation:

$$W_{F_1} = A_1(P_4 + A_2)(A_3 - T_6)$$

where $A_1$, $A_2$, and $A_3$ are design constants.

The multiplication on the right-hand side of this equation may be carried out by a combination of variable and fixed orifices in series in certain fuel flow conduits.

The recuperator gas temperatures ($T_6$) of the order of as high as 1400° F. must be sensed for use in the control. Liquid and gas filled bulbs are not suitable, since it is difficult to prevent permeation of the bulb walls by the fluid at such a high temperature, with a consequent error in calibration. We therefore will use a differential metal expansion device to respond to the recuperator temperature. The sensed expansion will be transduced to a hydraulic pressure for use in the control.

Metering of acceleration limit fuel, both primary and secondary, is accomplished by applying a fixed metering head to a valve whose port area is varied in proportion to the control parameters. Governing in steady state, for both rotors, is done by a proportional closed loop error sensing control, in which the desired operating variable (rotor $N_2$ for the high-pressure rotor, and compressor discharge pressure $P_2$ for the low-pressure rotor), are biased by inlet air temperature and are set by a manual power lever; and the governors act to vary fuel flow in proportion to the error between the actual and desired values of the variable.

Means are provided, when the $N_2$ governor cuts in, to augment the fuel flow to the low-pressure rotor by an amount equal to the reduction of $N_2$ rotor fuel. There is also a dashpot provision to delay deceleration of the $N_2$ rotor after throttle "chop."

A power turbine governor will proportionally reduce fuel flow to both combustors when a set speed is exceeded. A hydraulic pressure signal will be available to actuate an engine shut-down device when a set absolute maximum speed is reached.

Referring now to FIG. 2 of the drawings, there are shown, as principal elements of the engine mentioned hereinabove: a supporting body 1, an air inlet 2 leading to a low-pressure compressor $C_1$, which is connected by a shaft 3 to a low-pressure (secondary) gas turbine $T_{b_1}$. Compressed air is discharged from compressor $C_1$ through an intercooler 4, to a high-pressure compressor $C_2$, where its temperature is increased from $T_3$ to $T_4$, and its pressure is increased from $P_3$ to $P_4$. Intercooler 4 is provided with a fan 5, driven by countershafts 6 and 7 from shaft 3, to circulate cooling fluid around the air passages through said intercooler, and lowers the temperature $T_2$ of the air passing from compressor $C_1$ to a temperature $T_3$ of the air entering compressor $C_2$.

Compressor $C_2$ is connected by a shaft 8 to a high-pressure gas turbine $T_{b_2}$, and discharges its air through a recuperator RC, where the air is heated to a temperature $T_6$, by exhaust gases from low-pressure turbine $T_{b_1}$, flowing through a connecting conduit 9. After passing through recuperator RC, these gases are discharged through a passageway 10 into the outside air. A temperature sensor 11 senses the temperature $T_6$ in the recuperator RC, as more fully described hereinbelow. Low-pressure compressor $C_1$, turbine $T_{b_1}$ and connecting shaft 3 constitute the outer spool of the engine; while high-pressure compressor $C_2$, turbine $T_{b_2}$ and connecting shaft 8, constitute the inner spool of the engine.

The compressed air passing through recuperator RC flows into primary combustion chamber $B_1$, which receives fuel oil, through a conduit 12 from a fuel control unit 13, and the resulting combustion of said fuel in chamber $B_1$ generates gases that flow under increased temperature and pressure, through high-pressure turbine $T_{b_2}$, into secondary combustion chamber $B_2$. Additional fuel oil is fed into chamber $B_2$, from control unit 13, through a connecting conduit 14, and the additional combustion of this fuel in chamber $B_2$ increases the pressure and temperature of the gases therein. From chamber $B_2$, the combustion gases flow successively through a free power gas turbine PT, low-pressure turbine $T_{b_1}$, and recuperator RC. The free power turbine PT generates the useful power of the engine 1 which is transmitted by a shaft 15 to the driven load (e.g. wheels of a ground vehicle, or the propeller of a motor boat or aircraft).

The fuel control unit 13 is connected to a fuel supply tank 16, by a supply conduit 17, and an excess fuel return conduit 18. Unit 13 is also connected to the engine by: a conduit 19, which communicates with the discharge passage 20 of high-pressure compressor $C_2$; by a conduit 21, which communicates with a temperature bulb 22 located in air inlet 2; and by a conduit 23 which communicates with the discharge passage 24 of low-pressure compressor $C_1$. Shafts 25 and 26, connected to the shaft 8, drive a high-pressure rotor speed governor in control unit 13, and shafts 27, 28 and 29, connected to the power turbine shaft 15, drive a power turbine speed governor, also in control unit 13. Temperature sensor 11 is connected to control unit 13, by conduits 43 and 78, which transmit the control pressure ($P_c$) in unit 13 to said sensor.

SIMPLIFIED VERSION OF ENGINE

Figure 4:
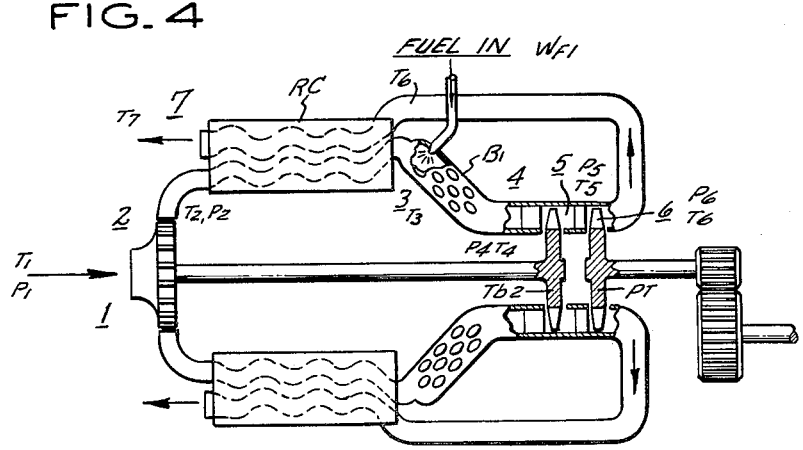
FIG. 4 is a schematic diagram of a simplified version of our invention, as hereinafter more particularly described.

In order to facilitate an understanding of one of the principal problems solved by our invention, we have depicted in FIG. 4 a simplified version of a free power gas turbine engine equipped with a recuperator. From a comparison of FIGS. 1 and 4, it will be noted that, in the simplified engine of FIG. 4, the low-pressure compressor $C_1$ and its driving turbine $T_{b_1}$, as well as the secondary combustion chamber $B_2$ (of FIG. 1) have been eliminated, and the exhaust gases from the high-pressure turbine $T_{b_2}$ pass directly to the free power turbine PT and are then returned directly to the recuperator RC.

Accordingly, only the following stations in the fluid flow path are considered, in FIG. 4: Stations 1 and 2 at the entrance and exit of the high-pressure compressor $C_2$; station 3 at the junction of the recuperator RC and combustion chamber $B_1$; station 4 at the junction of chamber $B_1$ and the high-pressure turbine $T_{b_2}$; station 5 between turbine $T_{b_2}$ and the free power turbine PT; station 6 between turbine PT and recuperator RC; and station 7 at the exit of the recuperator.

On the simplified basis of FIG. 4 just indicated, the following is an analysis of the functions and operation of the elements involved.

Air is drawn into the compressor at station 1, at pressure $P_1$ and temperature $T_1$, and leaves the compressor rotor at station 2 at a higher pressure and temperature $P_2$ and $T_2$; and the air from station 2 passes through the recuperator RC to station 3. In the recuperator RC, it receives heat from counter-flowing hot gas from the power turbine PT exhaust.

At station 3 the air, which has now been heated to temperature $T_3$, enters the combustion chamber $B_1$, where additional heat is added by burning fuel, ($W_{F_1}$). In the combustion chamber the air reaches a temperature $T_4$ at station 4, where it enters primary turbine $T_{b_2}$. The heated air expands through this turbine, doing work thereon, and leaves it at station 5 with the pressure and temperature $P_5$ and $T_5$.

The primary turbine $T_{b_2}$ is coupled to the compressor, and the combination of these two, with the recuperator RC and combustion chamber $B_1$, is referred to as the "gas generator" portion of the engine.

The gas from the gas generator, at pressure $P_5$ and temperature $T_5$, enters a second and independent power turbine PT at station 5 and expands to an exhaust pressure and temperature $P_6$ and $T_6$, at station 6.

During expansion through the free turbine PT, usually referred to as a "free power turbine," useful work is done, and this work may be extracted through a reduction gear coupled to the power output shaft.

The exhaust gas from station 6 is now passed through the recuperator RC, where it gives up heat to the counter-flowing compressed air from the compressor. The spent gas is finally exhausted from the engine at station 7.

There are two particular problems that arise in the control of such a recuperative gas turbine engine.

The first problem is this: the fuel flow to the combustion chamber must be modified according to the temperature of the air leaving the recuperator at station 3.

Structural and metallurgical limitations impose a top limit on the temperature of the gas entering the turbine at station 4, and this temperature is attained in three steps, starting with the inlet air at station 1, namely (1) The temperature rise ($T_2-T_1$) due to compression of the air,
(2) The rise ($T_3-T_2$) due to heat absorbed from the recuperator, and
(3) The rise ($T_4-T_3$) due to combustion of fuel.

So that the permissible top limit of the temperature $T_4$ shall not be exceeded it is therefore necessary that the control modify the fuel flow according to recuperator gas temperature $T_3$. This could be achieved quite well if temperature $T_4$ could be measured directly, and the fuel flow $W_{F_1}$ controlled so that the allowable maximum of $T_4$ is never exceeded. This, however, is impractical, since for one reason, $T_4$ is of the order of 1800° F. or more, and most measuring devices are not very reliable at such temperatures. A more important reason is that the characteristics of the engine are such that almost instantaneous response of the fuel flow is needed when $T_4$ is used as a measured control parameter, and all temperature measuring devices have time lags that are intolerably long.

However, we have discovered that the turbine $T_{b_2}$ can be protected against overtemperature without measuring $T_4$. As disclosed hereinbelow, a method is disclosed whereby a measurement of the lower temperature $T_3$ can be used, along with other control parameters, to control the fuel flow $W_{F_1}$ in such a way that the turbine gas temperature $T_4$ is limited to a maximum permissible value. Our method also avoids the need for very rapid response in the temperature measuring device, since the recuperator itself has a rather long time constant. Our temperature measuring device, as described hereinbelow, has an "anticipating" characteristic, so that the effect of time lags is even further minimized.

The second problem referred to above has to do with the torque output of the free power turbine PT. As shown hereinafter, when the gas generator portion of the engine is rotating at a speed $N_1$ r.p.m., and the temperature of the incoming air is $T_1$ degrees Rankine, and if the free power turbine is locked at standstill, the torque Q exerted by the free power turbine is a function of the "corrected" speed ($N_1/\sqrt{T_1}$).

As the temperature of the incoming air may vary from −65 degrees F. to +150 degrees F., the "corrected" speed (for variations in $T_1$) of the gas generator will vary by approximately 25%, when its actual speed is held constant. Unless precautions are taken, it is therefore likely that the output gearing from the free power turbine may be overstressed when the engine is running in a very cold environment. But if, instead of imposing a top limit on the actual speed $N_1$, we control the "corrected" speed ($N_1/\sqrt{T_1}$) of the gas generator, the torque Q exerted by the power turbine becomes independent of the incoming air temperature $T_1$, as will be shown hereinbelow, where we disclose a simple governor which achieves proper control of the "corrected" speed.

We now proceed to consider how the fuel flow $W_{F_1}$ to the gas generator turbine $T_{b_2}$ is related to the turbine inlet gas temperature $T_4$ and other engine operating parameters. This analysis is given to facilitate an understanding of the problem solved by our invention, and is therefore somewhat simplified. Thus, we have neglected all secondary effects due to engine efficiency, heat losses due to radiation, etc., but the basic conclusions are not thereby affected.

The discussion of this section is confined to the gas generator ($T_{b_2}$, $C_2$ and RC), of FIG. 4, and in Equations 1–24 hereinbelow $C_p$ denotes specific heat at constant pressure, B.t.u./lb.–°R.
$C_v$ denotes specific heat at constant volume, B.t.u./lb.–°R.
$g$ denotes acceleration of gravity H denotes heating value of fuel, B.t.u./lb.
J denotes energy conversion factor, 778 ft.-lb./B.t.u.
$\gamma$ denotes ratio of specific heats, $C_p/C_v$ The turbine inlet gas temperature $T_4$ is the sum of the temperature $T_3$ at the exit of the recuperator and the temperature rise $(T_4-T_3)$ in the combustion chamber.

$$T_4 = T_3 + \frac{W_{F_1}}{W_{A_1}} \times \frac{H}{C_p} \qquad (1)$$

Where $C_p$ and H are as indicated in the example following Equation 5, and $W_{F_1}/W_{A_1}$ is the fuel/air ratio in the combuster.

To prevent $T_4$ from exceeding a specified limit, say $T_4^*$, the fuel flow $W_{F_1}$ admitted must not exceed $$W_{F_1} = W_{A_1} \frac{C_p}{H} (T_4^* - T_3) \qquad (2)$$

When the turbine flow is "choked," or super-critical, which occurs whenever the pressure ratio across the turbine exceeds about 1.89, the following relation is known to apply.

$$\frac{W_{A_1}\sqrt{T_4}}{P_2} = k_T \qquad (3)$$

a constant; or $$W_{A_1} = \frac{k_T \cdot P_2}{\sqrt{T_4}} \qquad (4)$$

Substituting (4) in (2), and letting $T_4 = T_4^*$ $$W_{F_1} = \frac{k_T P_2}{\sqrt{T_4^*}} \times \frac{C_p}{H} \times (T_4^* - T_3) \qquad (5)$$

If this rate of fuel flow is admitted to the engine, the turbine inlet temperature $T_4$ will be maintained at its desired maximum, $T_4^*$.

For example, assume a gas generator consuming 3 lbs. of air per second at a turbine inlet temperature of 2400° R. and a compressor discharge pressure $P_2 = 200$ p.s.i.a. Then $$k_T = \frac{W_{A_1}\sqrt{T_4}}{P_2} \times \frac{3 \times 49}{200} = .735$$

and if $C_P = .24$ B.t.u./lb./° F, and $H = 17,000$ B.t.u./lb. of fuel, $$W_{F_1} = \frac{.735 \times 24}{49 \times 17000} P_2(T_4^* - T_3)$$

$= .000000212 \, P_2(T_4^* - T_3)$ lb./sec.

$= .000763 \, P_2(T_4^* - T_3)$ lb./hour

If the maximum permissible turbine gas temperature is set at $T_4^* = 2400°$ R. then the maximum limiting fuel flow that may be permitted to enter the engine is given by the equation $$W_F = .000763 \, P_2 \, (2400 - T_3)$$

and the control system of our invention, as disclosed herein, produces a relationship such as the above.

The general principle is as follows:

We set a value for $T_4^*$, which will be the greatest gas temperature allowed by engine limitations. We then measure the temperature $T_3$ at the recuperator outlet, and provide means to subtract this measured temperature from $T_4^*$.

We also measure the compressor discharge air pressure $P_2$, and provide means to mechanically multiply this by the quantity just obtained, as described hereinbelow.

The output of this mechanical computer then represents the permissible primary maximum fuel flow $W_{F_1}$ to the engine. In the embodiment of our invention disclosed hereinbelow, the output is used to vary the position of a primary fuel metering valve across which a constant pressure drop is maintained, and thus the fuel flow $W_{F_1}$ is limited in accordance with Equation 5, and the turbine is protected from damage due to overtemperature.

As described hereinafter, while the control is limiting fuel flow $W_{F_1}$ in accord with Equation 5, the speed governor is inoperative. But when the "corrected speed" is attained for which the manual lever is set, the governor will cut in to reduce the fuel flow below the value allowed by Equation 5, in such a way that the set speed will be maintained.

Turning now to the free power turbine PT, we shall justify the statement previously made, that the torque Q exerted by the power turbine PT is a single-valued function of the "corrected" speed of the gas generator portion of the engine.

The hot gas from the gas generator enters the free power turbine PT at station 5, and expands down to the pressure $P_6$ prior to flowing into the recuperator RC, which is designed so that the gas passing through it has a very small pressure drop, and the pressure $P_6$ will be substantially equal to the atmospheric pressure.

In this analysis, we again neglect secondary effects such as efficiency and heat loss, so that the basic conclusions may be clearly established.

When the exhaust gas from the gas generator portion of the engine, at temperature $T_5$ and pressure $P_5$, is allowed to expand freely through a nozzle down to pressure $P_1$, the kinetic energy acquired by each pound of exhaust gas is given by the expression $$Jc_pT_5\left[\left(\frac{P_5}{P_1}\right)^{\frac{\gamma-1}{\gamma}} - 1\right] \text{ inch-pounds} \qquad (6)$$

From (6) we conclude that the velocity acquired by the gas is $$u = \sqrt{2gJc_pT_5\left[\left(\frac{P_5}{P_1}\right)^{\frac{\gamma-1}{\gamma}} - 1\right]} \text{ inches per second} \qquad (7)$$

If this high velocity gas is directed peripherally against a turbine wheel, and directed through the turbine wheel so that its peripheral component of momentum is reversed (as is the case when the high velocity gas impinges on the blades of a stationary impulse turbine wheel), the torque exerted on the wheel is $$Q = 2\frac{W_A}{g}u \cdot r \qquad (8)$$

where $r$ is the radius at which the gas impinges. The torque Q is then, using (7) and (8):

$$Q = \frac{2r}{g} \cdot W_A \sqrt{2gJc_pT_5\left[\left(\frac{P_5}{P_1}\right)^{\frac{\gamma-1}{\gamma}} - 1\right]}$$

$$= \frac{2r}{g} \frac{W_A\sqrt{T_1}}{P_1} P_1 \sqrt{2gJc_p\frac{T_5}{T_1}\left[\left(\frac{P_5}{P_1}\right)^{\frac{\gamma-1}{\gamma}} - 1\right]} \qquad (9)$$

Figure 5:
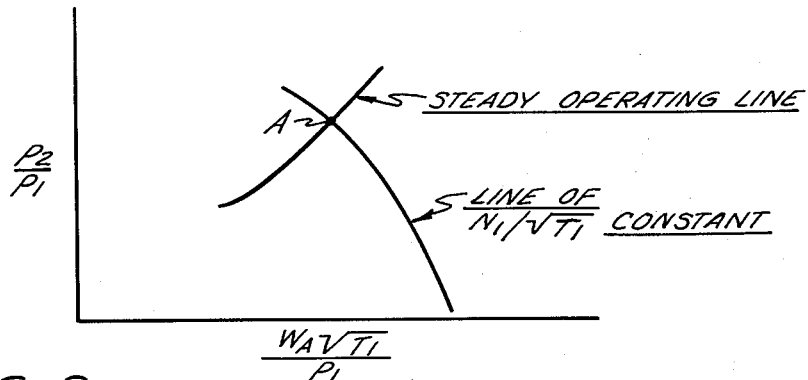

The curve in FIG. 5 shows a portion of a "performance map" of a simple gas turbine, or of the gas generator portion of a free-power turbine engine.

In steady operation at a constant corrected speed $N/\sqrt{T_1}$, the compressor map gives a steady operating point as at A (in FIG. 5), where it is well known that the following quantities are fixed:

Table I

| | |
|---|---|
| Corrected speed | $N/\sqrt{T_1}$ |
| Compressor pressure ratio | $P_2/P_1$ |
| Corrected air flow | $W_A\sqrt{T_1}/P_1$ |
| Corrected fuel flow | $W_F P_1/\sqrt{T_1}$ |
| Corrected turbine inlet temperature | $T_4/T_1$ |

From thermodynamics, and the equality of turbine work and compressor work $$(T_4 - T_5) = (T_2 - T_1) = T_1\left[\frac{T_2}{T_1} - 1\right]$$
$$= T_1\left[\left(\frac{P_2}{P_1}\right)^{\frac{\gamma-1}{\gamma}} - 1\right] \quad (10)$$

so that $$\frac{T_5}{T_1} = \frac{T_4}{T_1} - \left[\left(\frac{P_2}{P_1}\right)^{\frac{\gamma-1}{\gamma}} - 1\right] \quad (11)$$

Hence, $T_5/T_1$ is constant, as well as the quantities tabulated in Table I above.

Now consider the quantity $P_5/P_1$. From adiabatic expansion through the turbine, and assuming no pressure drop from station 2 to station 4, so that $P_4 = P_2$:

$$\frac{P_5}{P_1} = \left(\frac{P_5}{P_2}\cdot\frac{P_2}{P_1}\right) = \left(\frac{T_5}{T_4}\right)^{\frac{\gamma-1}{\gamma}} \times \frac{P_2}{P_1}$$
$$= \left(\frac{T_5}{T_1}\cdot\frac{T_1}{T_4}\right)\frac{P_2}{P_1} \quad (12)$$

So that $P_5/P_1$ is constant as well as the quantities tabulated in Table I.

Looking again at Equation 9, we now see that everything on the right hand side is constant when the corrected speed is constant, with the exception of $P_1$. So Q in (8) may be rewritten as a function of any of these interdependent constant quantities, like the corrected speed. Thus $$\frac{Q}{P_1} = f\left(\frac{N_1}{\sqrt{T_1}}\right) \quad (13)$$

Frequently the compressor inlet pressure is expressed in units of one standard atmosphere, using the notation $$\frac{P_1}{14.69} = \delta$$

and the inlet air temperature is expressed in units of 518.4 degrees F., using the notation $$\frac{T_1}{518.4} = \theta$$

Using this notation Equation 13 becomes $$\frac{Q}{\delta} = f\left(\frac{N_1}{\sqrt{\theta}}\right) \quad (14)$$

The above analysis was limited to the case of a free power turbine wheel at rest. If the wheel is rotating so that its peripheral velocity is $v$, then the gas from the nozzles approaches the wheel peripherally with the relative velocity $(u-v)$, and its direction is reversed so that it leaves the wheel with equal relative velocity $(u-v)$.

The torque exerted on the wheel is in this case $$Q = 2\frac{Wa}{g}(u-v)r \quad (15)$$

Using $u$ from Equation 7, we have $$Q = \frac{2r}{g}W_A\sqrt{2gJc_pT_5\left[\left(\frac{P_5}{P_1}\right)^{\frac{\gamma-1}{\gamma}} - 1\right]} - \frac{2rv}{g}\cdot W_A \quad (16)$$

The first term on the right of (16) is the same as the right side of (9), and we have already shown that this is equal to $f(N/\sqrt{T_1})$. It is then obvious from (16) and (13) that $$Q = P_1 f\left(\frac{N_1}{\sqrt{T_1}}\right) - \frac{2r}{g}\cdot\frac{v}{\sqrt{T_1}}\cdot P_1\cdot\frac{W_A\sqrt{T_1}}{P_1} \quad (17)$$

We have already stated in Table I that if $(N_1/\sqrt{T_1})$ is kept constant, then $(W_A\sqrt{T_1}/P_1)$ is also constant, so that Equation 17 may now be written as $$\frac{Q}{P_1} = f\left(\frac{N_1}{\sqrt{T_1}}\right) - \frac{v}{\sqrt{T_1}}f_1\left(\frac{N_1}{\sqrt{T_1}}\right) \quad (18)$$

or using the alternative notation $$\frac{Q}{\delta} = f\left(\frac{N_1}{\sqrt{\theta}}\right) - \frac{v}{\sqrt{\theta}}f_1\left(\frac{N_1}{\sqrt{\theta}}\right) \quad (19)$$

In Equations 18 and 19, the quantities $Q/P_1$ and $Q/\delta$ are referred to as the "corrected torque." These equations are interpreted to mean that when the corrected speeds of both the gas generator and the free power turbine portions of the engine are kept constant, then the corrected torque output of the gas turbine is also constant.

If the engine is operating in an environment where the inlet air pressure does not vary appreciably, as in the case of ground vehicle propulsion, for example, where the engine is nearly always close to sea level, the quantity $\delta$ is constant, and Equation 19 shows that in this case the actual output torque Q is a function of the corrected speeds, $N_1/\sqrt{\theta}$ of the gas generator and $v/\sqrt{\theta}$ of the free power turbine.

Equation 19 shows that maximum torque is exerted by the power turbine when it is at standstill—that is, when $v=0$, and it is in this case that the greatest load is applied to the output shaft gearing.

The foregoing analysis shows that for a constant compressor inlet pressure $P_1$, the corrected speed function $N/\sqrt{T_1}$ is solely a function of compressor inlet temperature $T_1$. Also, the corrected speed function $(N/\sqrt{T_1})$ is a function of the actual output torque (Q) such that there is a single value of output torque Q for each value of corrected speed $N/\sqrt{T_1}$. The definition of corrected speed "$N/\sqrt{T_1}$" shows that a variation in compressor inlet temperature $T_1$ will result in a variation of corrected speed $N/\sqrt{T_1}$. Since it is desired to maintain the actual output torque Q as nearly constant as possible, it is necessary to change the value of N when the value of $T_1$ changes in order to maintain the corrected speed $(N/\sqrt{T_1})$ constant. The value of N is changed by modifying the fuel flow to the gas generator so that a new value of N is established such that the $N/\sqrt{T_1}$ relationship is maintained unchanged. Thus, the fuel flow to the gas generator is regulated as a function of corrected speed which in turn is a function of compressor inlet temperature $T_1$.

It is also plain from (19) that this maximum torque can be limited by placing a maximum limit on the gas generator corrected speed $N_1/\sqrt{T_1}$ or $N_1/\sqrt{\theta}$.

Our invention includes a governor in which the corrected speed of the gas generator may be set by a manual lever and automatically maintained by a simple governor, and the operation of this device is also disclosed herein.

The foregoing discussion dealt with the speed of the gas generator and with the fuel flow to the combustion chamber in the gas generator portion of the engine.

In an actual free power turbine engine, means must be included for limiting the speed of the free power turbine. In some applications, such as in ground vehicle propulsion, it may be safe to assume that the power turbine, directly coupled to the driving wheels, will never overspeed except at a dangerously high velocity of the vehicle. In other applications, a separate governor, arranged to override the gas generator governor, may be included, as disclosed in co-pending patent application of Chandler and Wright, Serial Number 494,055, filed March 4, 1955, now Patent No. 3,108,435, issued October 29, 1963, and assigned to the same assignee as this application; and does not form part of the present invention.

PRIMARY FUEL FLOW CONTROL

Returning to FIG. 3, it will be noted that the fuel and speed control apparatus of our invention, shown in FIG. 2 as control unit 13, comprises a fluid-tight case 40, which houses all of the operating mechanisms of the control system. Fuel taken from tank 16 is conveyed through line 17 and pumped to a comparatively high pressure by pump 42 and then directed to the several control elements contained within case 40. Leakage flow from the several control elements contained within case 40 provides a flow of sufficient magnitude to fill and pressurize the case 40. The pressure in case 40 is maintained at a substantially constant control pressure $P_c$ somewhat less than the discharge pressure of pump 42, by a spring-biased ball check valve 41, through which excess fuel in case 40 is returned (by conduit 18) to fuel tank 16. Conduit 17 is connected to the inlet side of a high-pressure, positive-displacement pump 42 (preferably of the gear type), which is driven by the engine (1), through shafts 43 and 44, connected to shafts 26 and 25 (FIG. 2). Fuel discharged by pump 42 flows through conduits 45 and 46 to a primary metering valve 47, and thence through a conduit 48, a solenoid shut-off valve 49, a pressurizing check valve 50, and a conduit 51, which connects with conduit 12, leading to the primary combustion chamber $B_1$ of the engine.

Conduit 46 is connected by a conduit 52 to a primary metering head regulator 53, which is in turn connected by a conduit 54 to the inlet conduit 17 of pump 42, whereby a portion of the fuel discharged by pump 42 may be returned to the inlet side of the pump, whenever the pressure in chamber 55a, acting on a diaphragm 55 in regulator 53, is high enough to overcome the opposing force of a spring 56, plus the fuel pressure in chamber 57, and open a valve 58. The chamber 57 is connected, by a conduit 59 and a chamber 60, to conduit 48; so that the pressure differential acting on diaphragm 55, equals the pressure drop (metering head) across valve 47, and said metering head is thus maintained at a substantially constant value, as determined by the spring 56.

Conduit 45 is also connected to conduit 17, through conduit 61, relief valve 62 and conduit 63, so that the fuel pressure in conduit 45 can never exceed a safe, maximum value, as determined by a spring 64, which biases check valve 62 towards closed position.

The metering valve 47 is of the spool type, the upper end of which is attached to a diaphragm 65, between which and a stationary sleeve 66, in which the spool valve 47 moves, is a spring 67, so disposed as to urge the diaphgram upwards. As shown in FIG. 3, the lower side of diaphragm 65 is subject to the case fuel pressure $P_c$, and the upper side of the diaphragm is subjected to a pressure ($P_{R4''}$) so that the flow area through the metering valve 47 is due to a balance between the upward force of the spring and case pressure $P_c$ and the downward force due to the pressure $P_{R4''}$, acting on the diaphragm.

At the top left of the schematic diagram of FIG. 3 is shown a $P_4$ transducer 68 which converts the pneumatic discharge pressure ($P_4$), of the high-pressure compressor $C_2$, into a hydraulic pressure ($P_{R4}$) that is used to actuate the primary metering valve 47. Fuel at pump pressure ($P_F$) is admitted to the lower chamber 69 of the transducer 68 through a conduit 70 and restricting orifice 70a. The upper chamber 71 of the transducer is connected by pipe 19 to the discharge passage 20 of the high-pressure compressor, $C_2$, and the upper and lower chambers are separated by a flexible diaphragm 72 which is biased downwardly by a spring 73. Accordingly, the transducer 68 acts as a pressure regulator, such that the pressure $P_{R4}$ acting upwards on the diaphragm 72 will balance the downward force of the spring 73, plus the downward force on the diaphragm due to the compressor discharge pressure $P_4$.

Expressed mathematically, if $P_4$ is the compressor discharge pressure,
$A_D$ is the area of the flexible diaphragm 72,
$F_s$ is the downward force of the spring 73, and
$P_{R4}$ is the "regulated pressure"

then $$P_4 + \frac{F_s}{A_D} = P_{R4} \tag{20}$$

Denote the pressure in the case 40 by $P_c$. Then subtracting $U_c$ from both sides of (20):

$$(P_4 - P_c) = (P_{R4} - P_c) - \frac{F_s}{A_d} \tag{21}$$

At the top of FIG. 3 is shown a $T_6$ sensor 11, which is responsive to the temperature $T_6$ of the air at the exit of the recuperator RC.

The sensor 11 comprises an outer tube 75 of material having a high coefficient of expansion, surrounding an inner rod 76 of material having a low coefficient of expansion. When the sensor is exposed to a stream of gas at a high temperature, the tube, being fixed at its left hand end, will expand so that its free right hand end is appreciably displaced to the right. The inner rod 76, on the other hand, will remain at substantially its initial length (because of its low expansion coefficient). The result is that the left hand end of the inner rod 76 experiences a displacement to the right when the temperature $T_6$ increases.

The left hand end of the inner rod abuts a pivoted lever 77, with which is associated an orifice 78a, in such a way that when the inner rod 76 is displaced towards the right, because of an increase in $T_6$, the orifice 78a opens up, and vice versa.

A fuel line, comprising conduits 78, 79 and 80, connects the temperature sensor 11 to the transducer 68, and consequently the chamber 81 of the sensor 11 is normally filled with fuel from chamber 69 of transducer 68. To prevent this fuel from penetrating into the engine case, a flexible sealing bellows 82 is provided. The chamber 81 of the sensor 11 is vented to the case 40 of the control by a connecting conduit 43, and is thus subject to the case pressure $P_c$.

The pressure $P_{R4}$ in chamber 69 of the transducer 68 is equal to the compressor discharge pressure $P_4$+a constant $C_1$ which is determined by preload on spring 73. When orifice 78a is closed by lever 77 (and there is no flow through restrictions 79a and 141), the pressure in conduit 79 is equal to pressure $P_{R4}$ in chamber 69; however, when orifice 78a is opened by lever 77, in response to temperature $T_6$, fuel flows through restriction 80a, conduit 78, chamber 81 and conduit 43 into case 40. This reduces the pressure in conduit 79 from $P_{R4}$ to a lower pressure $P_{R4'}$, which reflects the effect of change in temperature $T_6$. A restriction 79a in conduit 79 still further lowers the pressure $P_{R4'}$ to $P_{R4''}$ when there is any fuel flow through branch conduit 84, as hereinafter described. The modified pressure $P_{R4''}$ acting on diaphragm 65, in opposition to the case pressure $P_c$ and the force of spring 67, actuates the primary metering valve 47 in accordance with the value of pressure $P_{R4''}$.

At the center right of FIG. 3 is shown a speed governor 85, which will be described below. Associated with the speed governor 85 is an orifice 84a, closed when the governor is not operating, which is the state during acceleration of the engine.

We now describe the situation during acceleration of the gas generator portion ($C_2$, RC, $B_1$ and $T_{b2}$), of the engine.

The primary metering valve 47, transducer 68, and $T_6$ sensor 11, with their associated elements, determine the primary fuel flow to the engine during acceleration, since the orifice 84a is closed because when the speed governor is inoperative, lever 86 closes said orifice.

The fuel flow to the engine for proper acceleration is, from Equation 5

$$W_{F_1} = k P_4 (T_4{}^* - T_6)$$

where $k$ is a constant, $T_4{}^*$ is the desired maximum allowable turbine inlet temperature, and $T_6$ is the measured temperature of the air leaving the recuperator.

Fuel from the fuel pump 42 is supplied to the $P_4$ transducer assembly through the orifice 70a, at some pressure $P_F$.

The upper chamber of the transducer is connected to the compressor discharge chamber 20 of the engine, and is therefore subjected to the pressure $P_4$.

Let $P_{R4}$ be the fuel pressure in the lower part of the transducer.

Then the downward force on the diaphragm is $(P_4 A_D)$, where $A_D$ is the effective area of the diaphragm 72 that separates the upper and lower chambers 71 and 69 of the transducer, plus the force $F_s$ of spring 73. The upward force on this diaphragm is $(P_{R4} A_D)$. When these forces are in equilibrium, we have already shown (Equation 20) that $$P_{R4} = P_4 + \frac{F_s}{A_D}$$

and the valve 72a attached to the diaphragm 72 will open or close to pass more or less fuel to the case 40 of the control at pressure $P_c$, to maintain the pressure $P_{R4}$ at the value given above. The manner in which such a pressure regulator works is well known.

Because the orifices 80a and 78a are in series between a region where the pressure is $P_{R4}$ to a region of lower pressure $P_c$, there is a continuous flow of fluid through 80a and 78a, and the fluid pressure in the line between 80a and 78a is denoted by $P_{R4'}$ in FIG. 3. From the law of pressure drop through orifices $$(P_{R4'} - P_c) = (P_{R4} - P_c) \frac{1}{1 + \left(\frac{A_c}{A_F}\right)^2} \qquad (22)$$

where $A_C$ and $A_F$ below denote the areas of orifices 78a and 80a respectively, and substituting (21) in (22)

$$(P_{R4'} - P_c) = \left(P_4 + \frac{F_s}{A_D} - P_c\right) \frac{1}{1 + \left(\frac{A_c}{A_F}\right)^2} \qquad (23)$$

The case pressure $P_c$ may be regulated to any value we please; in particular, we may make $P_c = F_s/A_D$, and in that case $$(P_{R4'} - P_c) = P_4 \frac{1}{1 + \left(\frac{A_c}{A_F}\right)^2} \qquad (24)$$

or $$\frac{F_s}{A_D}$$

may be made any other value necessary to produce the desired engine acceleration schedule by biasing $P_{R4}$ above $P_4$.

Primary metering valve 47 receives fuel from the main pump 42 at pressure $P_F$, and delivers it to the engine at pressure $P_M$. The pressure difference $(P_F - P_M)$ is maintained at a constant value by the by-pass pressure regulating valve 53.

It will be seen in FIG. 3 that diaphragm 65 to which is attached the spool of the metering valve 47 is urged downward by the pressure difference $(P_{R4'} - P_c)$, when there is no fuel flow through orifice 79a, and is urged upward by spring 67 whose rate is $k_s$.

The downward displacement of the metering valve is therefore proportional to the pressure $(P_{R4'} - P_c)$, and if the port area of the metering valve 47 is proportional to its downward displacement, then the flow of fuel through the valve is also proportional to $(P_{R4'} - P_c)$, i.e., $$W_{F_1} = c(P_{R4'} - P_c)$$

or substituting Equation 24

$$W_{F_1} = c P_4 \frac{1}{1 + \left(\frac{A_c}{A_F}\right)^2} \qquad (25)$$

Comparing this last equation with (5), it will be readily seen that the control shown schematically in FIG. 3 will produce the correct fuel flow provided $$c \cdot \frac{1}{1 + \left(\frac{A_c}{A_F}\right)^2} = k(T_4{}^* - T_6) \qquad (26)$$

Figure 6:
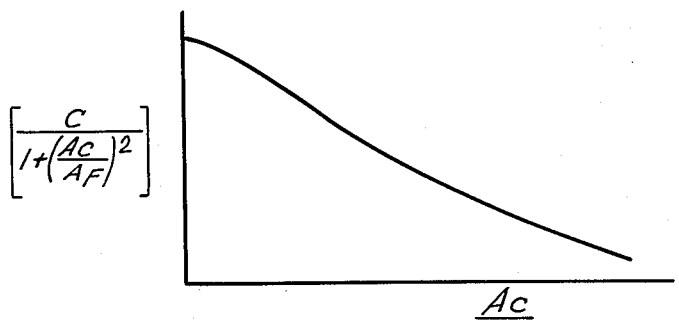

The orifice 80a of FIG. 3 being assumed fixed, it is readily apparent that as $T_6$ increases, the opening of orifice 78a increases, and the quantity on the left hand side of (26) decreases. The manner in which this quantity decreases with increasing $A_c$ in a somewhat non-linear way, is shown in FIG. 6.

At the right end, the floating lever 86 is subject to the upward force from a spring 89 that tends to rotate the floating lever counter-clockwise about the movable fulcrum. The lower end of this spring is urged upward by a bellows 90 as shown. The bellows 90, and a temperature-responsive bulb 91, which is connected to bellows 90 by a conduit 92, are filled with an incompressible fluid, and exposed to the compressor inlet air stream. The upward expansion of the bellows 90, and therewith the upward displacement of the bottom of the spring 89, is therefore proportional to the air stream temperature $(T_1)$.

When the upward force of flyweights 87 is low enough, the spring 89 and temperature bellows 90 will rotate the lever 86 about the movable fulcrum 88 until the lever bottoms on the orifice 84a, closing it effectively against leakage of fuel, and when this is the case, the upward force exerted by the spring 89 is proportional to the temperature $T_1$, say $k_T T_1$.

The distance between the point of application of the upward force of flyweights 87 and the spring 89 being $l$, and the movable fulcrum being positioned by the manual lever at a distance $x$ from the spring 89, we observe that the force $k_N N^2$ exerted by the flyweights 87 will overcome the force $k_T T$ exerted by the temperature bellows 90 and spring 89, whenever $$k_N N^2 (l - x) > k_T T_1 x$$

or when $$\frac{N^2}{T_1} > \frac{k_T}{k_N} \cdot \frac{x}{l - x}$$

or when $$\frac{N}{\sqrt{T_1}} > \sqrt{\frac{k_{T_1}}{k_N} \cdot \frac{x}{l - x}}$$

That is, whenever the "corrected speed" $(n/\sqrt{T_1})$ of the engine exceeds some value corresponding to a manually selected magnitude of $x$, the flyweight force will overcome the temperature spring force, and rotate the floating lever 86 in the clockwise direction. This causes the lever to separate from its resting place on orifice 84a, and the orifice will open.

From FIG. 3, it will be seen that the opening orifice 84a will cause the pressure $P_{R4'}$ to drop to a lower value $P_{R4''}$ because of the pressure drop across orifice 79a, and the result of this is a closing down of the main metering valve 47 with a consequent reduction in fuel flow $W_{F_1}$ to the engine. This reduction in fuel flow will prevent the engine from continuing its previous acceleration, and the speed of the engine will be held constant at the selected "corrected" value.

The tube 75 of the $T_6$ temperature sensor 11 is immersed in the gas stream at the exit from the recuperator (station 6 in FIG. 1).

We stated previously that the sensor 11 consists of an outer tube 75 of highly expandible metal, the tube being fixed at its left hand extremity to the case 74 and incloses a rod 76 of low coefficient of temperature expansion, the rod being attached to the tube 75 at its right hand end.

Now fixing attention on the left hand end of rod 76, it will be plain that this point will be displaced towards the right as the temperature of the whole assembly is raised, and vice versa, due to the relative differential expansion of the tube 75 and the rod 76, so that an increase in the temperature $T_6$ results in a proportionate opening of the orifice 78a.

We mentioned above the "anticipating" effect of the $T_6$ sensor. Suppose the temperature $T_6$ suffers a sudden change (say an increase) from a previously existing steady value. This increase will be immediately detected by the highly expansive outer tube 75, the free end of which will at once begin to move to the right, pulling the inner rod 76 with it and opening the orifice 78a. Some appreciable time later, heat due to the increase in $T_6$ will penetrate into the low coefficient of expansion inner rod 76, which will then move in a direction tending to close the orifice 78a. By suitable matching of the time delays in the temperature response of the two elements 75 and 76 of the sensor 11, the net over-all response can be matched to the response of the recuperator RC itself, so that transient effects of changes in $T_6$ can be compensated for.

The operator's control of the speed and power of the engine 1 is effected by a manual control lever 93, which is fixed to a shaft 94, journalled in the case 40 and extending into control unit 13, as shown in the upper right corner of FIG. 3. Also fixed on shaft 94 is a cam 95, on which rides a follower 96 whose other end is attached to a piston 97, so that when cam 95 is rotated through an angle PLA which increases its pitch radius, piston 97 is moved to the left in a cylinder 98, against the force of an opposing spring 99. A rod 100 connects piston 97 with roller 88 and piston 97 is provided with a passage 101 through which liquid may pass only from left to right by virtue of check valve 101a. Motion of piston 97 is not therefore effected to the left, however motion to the right is at a retarded rate determined by the size of the opening of passage 102, as determined by adjusting needle valve 103 into case pressure $P_c$ so that cylinder 98 and piston 97 function as a dash-pot, to retard the rate at which a movement of lever 93 may move the roller 88 to the right only, and thereby change the rate of retarding the $N_2$ throttle setting of the engine. The retarding dash-pot action of cylinder 98 and piston 97 is required to prevent such sudden changes in fuel flow $W_{F_1}$ (upon quick movements on lever 97) as may cause compressor and engine stall or burner blow-out.

Liquid fuel is displaced from cylinder 98 through a passage 102 which communicates with the interior of case 40, and such admission of fuel is controlled by an adjustable needle valve 103, which is screw-threaded through the wall of case 40 and provided with a slot 104, whereby the valve 103 can be adjusted from the outside of case 40.

Solenoid valve 49 is adapted to open and close communication between conduit 48 and chamber 60, upon energizing or deenergizing of a solenoid 105, which is accomplished by manually closing or opening a switch 106, in an electric circuit 107 to which current is supplied by a battery 108 (as shown in FIG. 2). When the operator desires to stop the engine 1, he opens switch 106, which deenergizes solenoid 105, and closes valve 49, whereupon the fuel flow $W_{F_1}$ to the engine is shut off.

The ball check valve 50 maintains a desired fuel pressure in the fuel control apparatus at all times, and prevents escape of fuel from chamber 60, when valve 49 is closed.

SECONDARY FUEL FLOW CONTROL

So far, we have considered those elements of our fuel control apparatus, depicted in the upper part of FIG. 3, that regulate the primary fuel flow to the engine. We will now describe the elements in the lower part of FIG. 3 which control the secondary fuel flow to the engine.

A conduit 110 connects conduit 61 with branch conduits 111 and 112. Fuel from 110 flows through a restriction 113 in conduit 112, under a reduced pressure $P_{R2}$ into the lower chamber 114 of a transducer 115, and from thence through a restriction 116 in a conduit 117, under a reduced pressure $P_{R2'}$, into a chamber 118 of a secondary fuel metering valve 119. A flexible diaphragm 120 separates chamber 118 from a chamber 121, into which fuel enters from case 40 through a port 122 at case pressure $P_c$, so that said diaphragm is subject to the pressure differential $(P_{R2'}-P_c)$. Diaphragm 120 is attached to valve 119 and a spring 123 biases said diaphragm to the left, whereby the fuel flow area through valve 119 is varied in accordance with the fuel pressure differential $(P_{R2'}-P_c)$ and the rate of spring 123.

Fuel flows through conduits 110 and 111, a chamber 124 (of a throttling metering head regulator 125), a valve 126, a chamber 127, conduits 128, 129, 130 and 131, a solenoid shut-off valve 132, a check valve 133, and conduit 14 (of FIG. 2) to the secondary combustion chamber $B_2$ of the engine 1.

In the metering head regulator 125, a diaphragm 134 separates chamber 127 from a chamber 135, connected by conduits 136 and 137 to conduit 131, and houses a spring 138 that biases valve 126 (attached to diaphragm 134) towards the open position. Valve 126 reduces the fuel pressure from a value $P_F$ in chamber 124, to a value $P_S$ in conduits 128 and 129, and valve 119 reduces the pressure $P_S$ to a value $P_{M2}$ in conduits 130 and 131. Conduit 136 transmits the pressure $P_{M2}$ to chamber 135, so that the valve 126 responds to the pressure differential $(P_S-P_{M2})$ and the force of spring 138.

A conduit 140, having a restriction 141, connects conduit 79 to a chamber 142 of a secondary fuel flow augmentation valve 143, which comprises a spool valve 144 attached to a flexible diaphragm 145, separating chamber 142 from a chamber 146 that is connected by a conduit 147 with conduit 84. A spring 148, attached to diaphragm 145 biases valve 144 towards closed position, in opposition to the fuel pressure differential between chambers 142 and 146 acting on diaphragm 145. The flow area through valve 144 establishes an additional fuel flow path from conduit 129 to conduit 137, which augments the fuel flow through secondary metering valve 119.

A conduit 150 connects conduit 117 (upstream of restriction 116) with a chamber 151 which is closed by a flexible diaphragm 152, having an attached fixed pivot 153, that contacts a floating lever 154. The right end of lever 154 is biased upwardly by a spring 155, so as to rock in a counterclockwise direction about a movable roller pivot 156, in opposition to the upward thrust of fixed pivot 153 by diaphragm 152. The movement of the left end portion of lever 154 varies the flow area through nozzles 157 and 158 at the upper ends of conduits 159 and 160. Conduit 159 is connected to conduit 140 by a conduit 161, so that variations in the flow area of nozzle 157, by movement of lever 154, causes variations in the pressure in conduit 140 and chamber 142.

Roller pivot 156 is connected by a link 162 to a roller cam follower 163 which rides upon a cam 164 to which it is held in contact by a spring 165. Cam 164 is pivoted at 166 and is connected by a link 167 with cam 95, so that as cam 95 is rotated by lever 93, cam 164 is also correspondingly rotated, about its pivot 166. Spring 155 seats in a movable abutment 168, supported by the left end of a lever 169, which is pivoted at 170, and whose right end is interposed between spring 89 and bellows 90, so that expansion or contraction of said bellows (responsive to air inlet temperature $T_1$ in tube 91) varies the tension of spring 155 and the loading of lever 154.

The lower end of conduit 110 has a restriction 171, and is connected by a conduit 172 to a chamber 173, which is closed by a flexible diaphragm 174. A link 175 connects diaphragm 174 with a lever 176, which is pivoted at 177 and biased in a clockwise direction by a spring 178. Movement of the right end portion of lever 176 varies the flow areas through nozzles 179, 180 and 181, into a chamber 182 which communicates through a port 183 with case 40, whereby the pressure in chamber 182 is case pressure $P_c$.

A conduit 184 connects conduits 117 and 160, so that the pressure ($P_{R2'}$) in 117 is varied by variations in the flow area through nozzles 158 and 179. Nozzle 180 is connected by a conduit 185 with conduit 161, so that the pressure in chamber 142 is varied by variations in the flow areas through nozzles 157 and 180. Nozzle 181 is connected by a conduit 186 with chamber 146 pressure from conduit 147 may be discharged through conduit 186 and nozzle 181, so that the pressure in chamber 146 is varied by variations in the flow area through nozzle 181.

Returning to the low-pressure compressor discharge pressure ($P_2$) transducer 115, it will be noted that the pressure $P_2$ is transmitted from discharge chamber 20 in engine 1 to the fuel control unit 13 by conduit 23, which is connected to a chamber 190, and said pressure and a spring 191 act on a diaphragm 192, attached to a valve 193, which controls the fuel flow from chamber 114 into case 40, whereby transducer 115 converts the pressure $P_2$ to a control pressure $P_{R2}$.

Conduit 172 connects conduit 110 (downstream of restriction 171) with an annular groove 210 in a power turbine speed governor 211, which is driven by the engine 1, through connected shafts 29, 28, 27 and 15 (FIG. 2). Drive shaft 29 is connected to a spindle 212 which terminates at its upper end in a horizontal cylinder 213, having at its opposite ends case pressure port 214 and outlet port 215. Cylinder 213 rotates in a chamber 216 which communicates through a port 217 with case 40. A passageway 218 and 210 connects conduit 172 with the interior of cylinder 213, in which is mounted a slidable spool valve 219 that is biased toward port 215 by a spring 220. Valve 219 has a passage 221 through which liquid fuel flowing through conduit 172 and passageway 218 escapes into the right end of cylinder 213 and from thence through port 215 into chamber 216 to the case via opening 217.

By virtue of the foregoing arrangement of the elements of speed governor 211, said governor generates in conduit 172 a pressure ($P_{RPT}$) which is proportional to the speed ($N_{PT}$) of the power turbine PT. A conduit 222 connects conduit 172 with a speed (r.p.m.) guage 223 which is located so that the engine operator may know the speed (r.p.m.) of the power turbine at all times.

Ignition fuel flow required to start the engine 1 is provided through a conduit 187, having a manually adjustable needle valve 188, which is connected to primary fuel conduit 12, whereby fuel is fed into combustion chamber $B_1$.

OPERATION OF CONTROL SYSTEM

The fuel control system of our invention determines two fuel flows to the engine, viz.: a primary fuel flow and a secondary fuel flow, as follows:

$$W_{F_1}=A_1(P_4+A_2)(A_3-T_6) \quad (A)$$
$$W_{F_2}=A_4(P_2+A_5)+W_{F_2'} \quad (B)$$

where $W_{F_1}$=primary fuel flow
$P_4$=high-pressure compressor discharge pressure
$T_6$=recuperator temperature
$A_1, A_2, A_3$=design constants and $W_{F_2}$=secondary fuel flow
$P_2$=low-pressure compressor discharge pressure
$A_4, A_5$=design constants
$W_{F_2'}$=secondary augmentation flow and is proportional to the amount of cut in of the primary fuel flow governor (the $N_2$ governor).

Both primary and secondary fuel flows $W_{F_1}$ and $W_{F_2}$ are scheduled as a function of the positions of a primary metering valve 47, and a secondary metering valve 119, in a system where the metering heads, or pressure drops across these valves are held constant.

The primary metering head regulator 53 bypasses fuel flow around the fuel pump 42 and the secondary metering head regulator 125 throttles the fuel flow, as required to hold a constant drop across the metering valves of both circuits. The magnitude of metering head is determined by the area of the diaphragm in each regulator, divided into the preload of its spring.

Identical pressure transducers 68 and 115 are used in the primary and secondary fuel circuits to convert pneumatic engine signal pressures to hydraulic pressures. The pressure transducers throttle incoming pump discharge pressure to scheduled levels above the pneumatic $P_4$ and $P_2$ engine pressures. These scheduled pressures being $P_{R4}$ and $P_{R2}$ respectively, as expressed by:

$$P_{R4}=P_4+C_1$$

and $$P_{R2}=P_2+C_2$$

The values of $C_1$ and $C_2$ are determined by the spring preload on the transducer diaphragm.

The variable bleed circuits in both the primary and secondary fuel systems serve to modulate the transduced pressures $P_{R4}$ and $P_{R2}$ for acceleration fuel scheduling. These circuits are as shown in the upper and lower parts of FIG. 3, respectively.

During acceleration, bleeds 84a, 157, 158 are closed, as well as 179, 180 and 181 which open only during power turbine governor operation. The power turbine PT acts only as a topping governor to prevent overspeed of the output shaft 15. Therefore, the modulated pressure $P_{R4''}$ and $P_{R2'}$ establish the respective primary and secondary acceleration flows as follows:

$$W_{F_1}=A_1(P_4+A_2)(A_3-T_6) \quad (A)$$
$$W_{F_2}=A_4(P_2+A_5)+W_{F_2'} \quad (B)$$

With orifices closed as noted above, $P_{R4'}=P_{R4''}$, and for a fixed value of $T_6$, acceleration flow would be proportional to $P_4$+a constant. However, by bleeding off through variation in $T_6$ which varies orifice 78a, the schedule can be proportionally changed as a function of $(A_3-T_6)$ to meet the schedule dictated by the equation (A) above.

With orifices closed, as noted above, $P_{R2'}=P_{R2}$, and the schedule noted above can be achieved, since $$P_{R2}=P_2+C_2$$

and since metering head is constant and fuel flow is a function of $P_{R2}$. As the ($N_2$) speed governor 85 cuts in, a pressure drop occurs across orifice 79a, with the commencing of flow through orifice 84a. This pressure drop is a function of the opening of orifice 84a, which determines the flow and hence, this drop ($P_{R4'}-P_{R4''}$) across 79a. This pressure drop across the augmentation valve 143 will produce a stroke of this valve proportional to ($P_{R4'}-P_{R4''}$), since stroke is determined by the area of valve diaphragm 145, and the preload and rate of spring 148. Increasing the governor 85 cut-in increases ($P_{R4'}-P_{4''}$), which produces increasing stroke and hence, increasing fuel flow. The secondary system fuel metering head is maintained across the augmentation valve 144, hence making change in fuel flow a function of stroke.

Maximum augmentation fuel flow can be limited by a maximum flow stop on this valve.

Therefore $W_{F_2'}$ is defined as follows:

$$W_{F_2'} = A_6(P_{R4''} - P_{R4'''}) = A_7(N_{2B} - N_{2A}) \quad (C)$$

where $N_{2A} = (N_2)$ governor 85 cut in speed
$N_{2B} = (N_2)$ actual speed after cut-in.

Primary and secondary steady state fuel flows, $W_{F_1}$ and $W_{F_2}$, are achieved by modulating $P_{R4''}$ and $P_{R2'}$ pressures. In the primary circuit, $P_{R4''}$ pressure is modulated by the $N_2$ governor 85, via bleed 84a. In the secondary circuit, $P_{R2'}$ pressure is modulated by the $P_2$ governor, via bleed 158. Primary and secondary fuel flows are thereby established in accordance with the error in set ($N_2$) speed and ($P_2$) pressure parameters.

Governor droop rates may be varied by changing bleed 79a in the primary circuit, and by changing bleed 116 in the secondary circuit. Reducing the flow areas for each bleed will respectively increase droop rates. This adjustment may also be made by changing the rate of spring 89 of governor 85, or the rate of spring 155 of the $P_2$ governor.

The change in $T_1$ temperature, as sensed by the $T_1$ sensor 91, produces a change in length of the $T_1$ motor bellows 90, which varies the set preload on spring 89 of the governor 85. Increasing $T_1$ temperature increases the bellows 90 length, which in turn increases the preload of the governor spring 89, and reduces the preload of the $P_2$ governor spring, to correct set speed conditions, as a function of $T_1$ temperature, in order to meet the $T_1$ correction requirements.

The selection of pressure ($P_2$) and speed ($N_2$), as a function of throttle angle PLA, is determined by the $N_2$ and $P_2$ governor cams 95 and 164 respectively, which set the lever arm ratio between spring preload and set reference forces on the respective governors.

A spring loaded dash pot, 97–99, with provision for a variable flow rate, limits the deceleration time of the high-pressure compressor ($C_2$) spool. In the increasing speed direction, the dash pot 97–99 has no effect and, therefore, a set speed is established directly by power lever angle PLA. A screw adjustment 103 is provided to vary the area of port 102 which bleeds flow from the dash pot during deceleration of the $N_2$ spool ($C_2 - T_{b2}$). This area may be adjusted to permit decelerations of the order of less than 1.0 second to more than 15 seconds.

The delaying of ($N_2$) deceleration prevents the low-pressure compressor $C_1$ from going into surge, by equalizing the deceleration rates of the two rotor spools, ($C_1 - T_{b1}$) and ($C_2 - T_{b2}$). The ($C_1 - T_{b1}$) spool has a much lower inertia hence, tends to decelerate faster than the ($C_2 - T_{b2}$) spool.

The power lever 93 may be set in any position from idle to maximum power before the engine is cranked. Minimum primary acceleration fuel flow is supplemented with the preselected ignition flow for proper ignition. Secondary flow is shut off by solenoid-operated valve 132 in the secondary fuel line until primary ignition occurs. After primary ignition, secondary fuel flow is turned on, providing acceleration flow for secondary ignition. As the engine accelerates, acceleration flow is metered in both fuel circuits until the preselected steady state speed ($N_2$) or pressure ($P_2$) is approached. Since the $N_2$ spool accelerates much faster than the $P_2$ pressure spool, the $N_2$ governor will cut in first, thereby opening bleed 84a and reducing primary fuel flow, in accordance with the control-determined droop gain ($W_{F_1}/N_2$ error). Flow will continue to be reduced from the acceleration value as speed ($N_2$) increases until the required steady state speed is achieved. As the engine continues to accelerate (due to increasing $P_2$ pressure), the speed ($N_2$) is held constant. As the (power-lever determined) steady state $P_2$ pressure is approached, the $P_2$ governor cuts in, thereby opening bleed 158, and causing secondary fuel flow ($W_{F_2}$) to be reduced in accordance with the control-determined droop gain ($W_{F_2}/P_2$ error). Secondary fuel flow ($W_{F_2}$) will continue to be reduced after governor cut-in as the $P_2$ pressure increases, until the required secondary steady state fuel flow is achieved. The $P_2$ pressure will then be controlled at a predetermined pressure above $P_2$ governor cut-in. The supplementary ignition flow will be turned off at a predetermined $N_2$ speed or $P_2$ pressure.

Subsequent increasing of the power lever angle will increase $N_2$ speed and $P_2$ pressure to prescheduled levels as a function of power lever angle.

Engine deceleration is achieved by retarding the rate of change in the power lever angle PLA. A direct reduction of secondary fuel flow ($W_{F_2}$) will result in a flow level which is set, either as a function of the secondary circuit bleed sizes, or to the minimum flow established by an adjustable flow stop, whichever limits the higher level. Although the $N_2$ governor lever has been retarded, which would normally result in a direct flow reduction as in the secondary system, dash pot 97–99 limits the retardation of the lever cam follower 96 of the $N_2$ governor. $N_2$ speed is reduced, therefore, as a function of time. This action prevents an undesirable mismatch in speed of the two engine spools during deceleration. Fuel flows in both circuits is reduced until the new desired steady state parameters are achieved.

Normal engine shut down may be effected by retarding the power lever 93 to the idle speed position, and then shutting off fuel flow in both fuel circuits by operation of solenoid valves 49 and 132.

If, during operation of the engine, the power turbine speed ($N_{PT}$) exceeds a preset value, as determined by the spring preload setting on the power turbine governor diaphragm 151, the power turbine governor will operate to open orifices 179, 180 and 181, which in effect cause cut-in of the $P_2$ and $N_2$ governor circuits, and bleed off of the high-pressure side of the augmentation valve diaphragm 145, to effect closing down of the three metering valves 47, 119 and 144 in the control. The closing down of these valves is proportional to power turbine governor 211 set speed error, and the respective gains are determined by the combinations of sizes of orifices used in the respective circuits.

A pressure signal is generated by the power turbine governor system to provide a gauge 223 indication of power turbine speed. This pressure may also, if desired, be used to operate a preset pressure switch which would deenergize the solenoids and shut down the engine.

Ignition fuel flow to start the engine is provided from conduit 110 through an adjustable needle valve 188 in branch conduit 187, of the engine primary fuel circuit; and an engine solenoid actuated valve 189 is used to initiate and turn off ignition flow.

Figure 7:
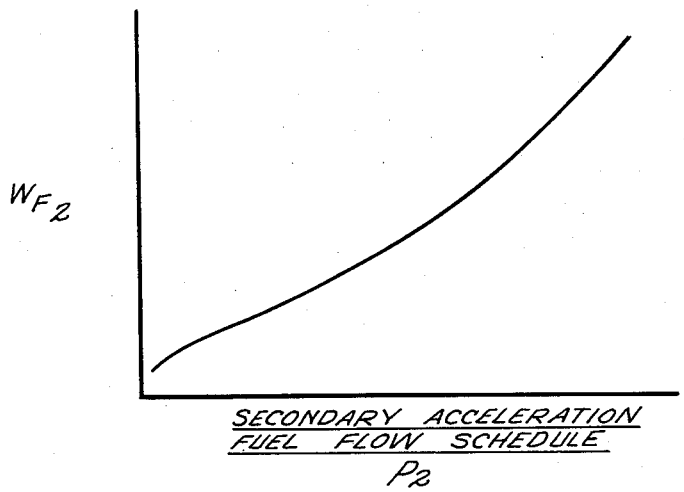

The high-pressure spool ($C_2 - T_{b2}$) is cranked by a starting motor (not shown), the primary ignition switched on, and solenoid valve 49 is opened by closing switch 106, to start primary fuel flow $W_{F_1}$, which is supplemented by ignition fuel flow through valve 188. The primary flow $W_{F_1}$ will be metered in accordance with $T_6$ temperature and $P_4$ pressure, as specified by the primary acceleration schedule (FIG. 7). The ignition flow will be provided by a parallel path through the adjustable fuel flow valve 188, and solenoid valve 189, in the control unit 13; and this ignition flow is added to the control primary fuel flow. The amount of ignition flow may be trimmed as required to individual engine requirements.

When ignition occurs and the temperature sensor 11 senses the temperature in the primary combustion in chamber $B_1$, switch 190 (FIG. 2) is closed. This will shut off ignition flow, and energize the secondary fuel flow solenoid valve 132. The fuel flow, scheduled with low-pressure compressor delivery pressure ($P_2$), (FIG. 7), will determine the starting flow to the secondary combustor $B_2$.

Figure 8:
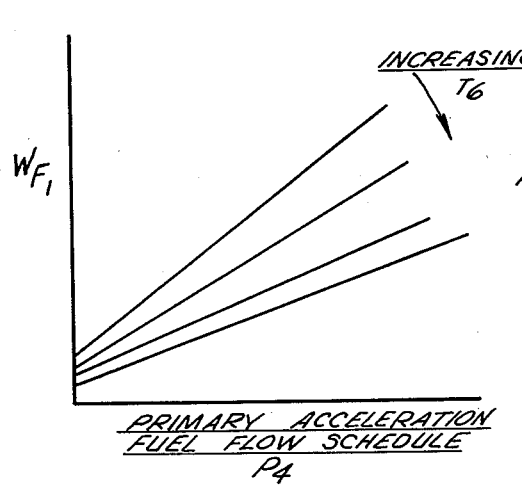

Upon ignition, the engine will accelerate to slow idle speed, if the power lever has not been advanced to any other position that may be required by an arbitrarily selected power lever setting. The engine is accelerated by advancing the power lever 93 from any power lever setting to a higher power lever setting. The primary system acceleration schedule is defined by $P_4$ pressure, modified as a function of recuperator temperature $T_6$, as shown in FIG. 8.

Engine compressor pressure $P_4$ is sensed by the control $P_4$ hydraulic transducer 68, which produces the equivalent hydraulic pressure $P_{R4}$. $P_{R4}$ is maintained at a constant value above $P_4$ by the selected preload on spring 73, to produce the required schedule as defined in FIGURE 7, and allows the control to reduce fuel flow below the starting value during governing. The $P_4$ transducer 73 operates on pump pressure $P_F$, as supplied through orifice 70a and bypassed through regulated orifice 68a.

$P_{R4}$ is supplied to the $W_{F_1}$ metering valve diaphragm 65 through orifices 80a and 79a. The pressure between these two orifices ($P_{R4'}$) is varied by the $T_6$ temperature sensor 11 which in effect reduces $P_{R4}$ to a value ($P_{R4'}$), lower than $P_{R4}$ by the amount of increase in $T_6$ temperature or bleed off through orifice 78a. The $T_6$ sensor 11 operates on differential expansion between the tube 75 and contained rod 76, to uncover orifice 78a as a function of $T_6$. With orifice 84a closed, and no flow through orifice 141, the pressure $P_{R4'}$ (equal to $P_{R4''}$) positions the $W_{F_1}$ metering valve 47 against its loading spring 67.

Fuel flow $W_{F_1}$ through the metering valve 47 is a function of valve position only, since the primary flow metering head regulator 53, operates to maintain a constant pressure drop across the metering valve 47. The metering head regulator 53 senses this differential pressure and bypasses pump output flow to pump inlet 17, as required to regulate the metering head.

The control pressure $P_2$ is sensed by transducer 125 and converted to the required biased $P_{R2}$ pressure, by the same method that was utilized by the $P_4$ transducer 68.

The pressure $P_{R2'}$ equal to $P_{R2}$ (when there is no flow through orifice 116), positions the $W_{F_2}$ metering valve 114 in accordance with the requirements of the engine, as shown in FIGURE 7. The position of the metering valve 119, as with valve 47 in the primary system, determines the secondary fuel flow, ($W_{F_2}$), since the pressure differential across valve 119 is maintained constant by the secondary metering head regulator 125.

The secondary flow metering head regulator 125 senses the pressure differential across metering valve 119 and throttles the pump output pressure $P_F$, which is established by the primary flow system, to maintain a fixed head across the secondary metering valve 119 (and, as will be discussed later, the augmentation flow valve 144).

Figure 9:
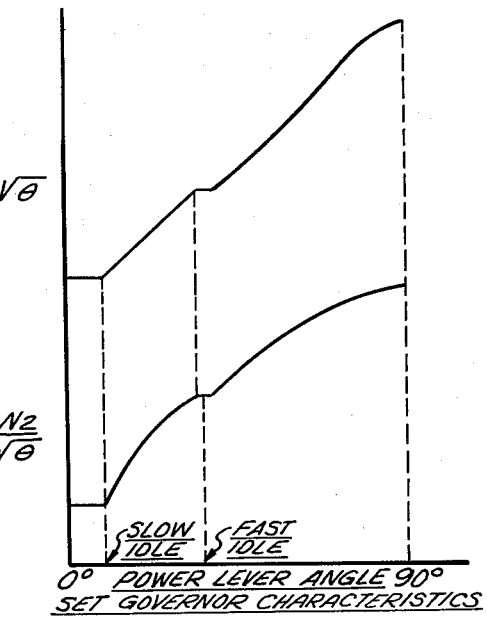

The fuel control system will accelerate the engine until steady state conditions (as dictated by the power lever setting) are achieved. Steady state control is maintained by the $N_2$ governor 85 and $P_2$ governor, respectively, for the primary and secondary systems. General governor operation is indicated in FIGURE 9 for both the $N_2$ and $P_2$ system.

Figure 10:
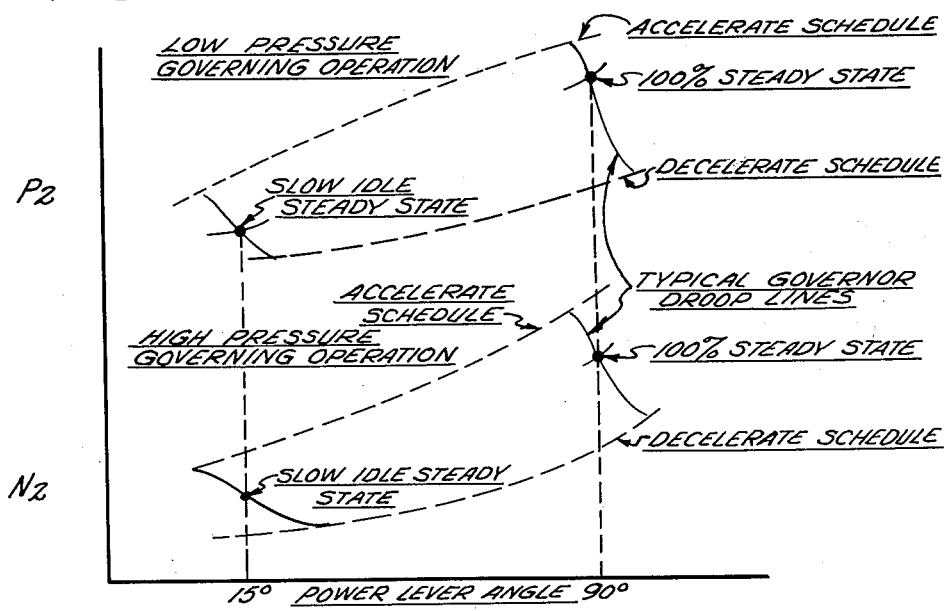

The $N_2$ governor 85 setting is established by the preload force in the spring 89 loading the governor flyweight 87 toes. The preload of the spring 89 is increased with increasing power lever angle PLA through the cam 95, roller 88, and lever 86 arrangement to increase set speed with power lever angle. The $T_1$ temperature sensor also increases this preload, with increasing $T_1$ temperature, to maintain set values of corrected speed. The governor 85 setting, as a function of $T_1$ and PLA, is indicated by FIGURE 10.

As the $N_2$ governor flyweight 87 centrifugal force increases with $N_2$ speed, and at the point where said force equals the spring 89 preload (as determined by $T_1$ and PLA), the governor 85 cut-in begins. The flyweight 87 toes lift lever 86 and uncover orifice 184a, reducing $P_{R4''}$ and hence, $W_{F_1}$. The rate of cut-in with speed error is determined by the net governor spring 89 rate, flyweight 87 design, and the selected orifices of the primary metering computing system. During governor cut-in, a pressure drop, as a function of the amount of cut-in, will appear across orifice 79a. This pressure drop is used to position the augmentation flow valve 144 in the secondary flow system.

The $P_2$ governor cut-in point is determined by the spring 155 preload, acting against the diaphragm 152. The opposing force is set, in the increasing direction with increasing power lever angle PLA, by the $P_2$ governor cam 164. This opposing force is also biased to decrease, with increasing $T_1$ temperature, through a linkage 169 from the $T_1$ sensor bellows 190, to maintain a value of corrected $N_1$ setting at any selected value of PLA.

As $N_1$ speed increases, increasing the corresponding $P_2$ and $P_{R2}$ pressures, the diaphragm 152 force will overcome the opposing preload from spring 155, and uncover orifice 158, effecting cut-in of the $P_2$ governor by bleeding off pressure $P_{R2'}$. The rate of cut-in, with pressure error signal, is a function of the diaphragm 152 size, net governor spring 158 rate, and the selected orifices of the secondary metering system.

The pressure drop across orifice 79a, applied across the diaphragm 145, acting on the augmentation valve 144, will add fuel flow to the secondary system in parallel with the secondary metering valve 114, proportional to the amount of $N_2$ governor cut-in. This augmentation fuel flow $W_{F_2'}$ will be zero at zero cut-in and rise to a maximum preset value at some percentage of cut-in.

Since the augmentation flow $W_{F_2'}$ is desired only during acceleration of the engine, means is provided to shut off augmentation flow during deceleration. This will be discussed below. With decreasing $N_2$ shaft horsepower load, augmentation flow to the secondary is increased to optimize performance.

The engine is decelerated by retarding the power lever 93 from any higher power lever setting to a lower lever setting.

Retarding the power lever angle will unload the governor flyweights 87, causing the toes to rise to a high position and completely uncover orifice 84a. This reduces $P_{R4''}$ pressure to a lower value, causing the metering valve 47 to close off toward a minimum value, and reducing the primary metered flow $W_{F_1}$ to the engine. The engine will then decelerate to a new steady state operating point, corresponding to the newly selected power lever angle.

Figure 11:
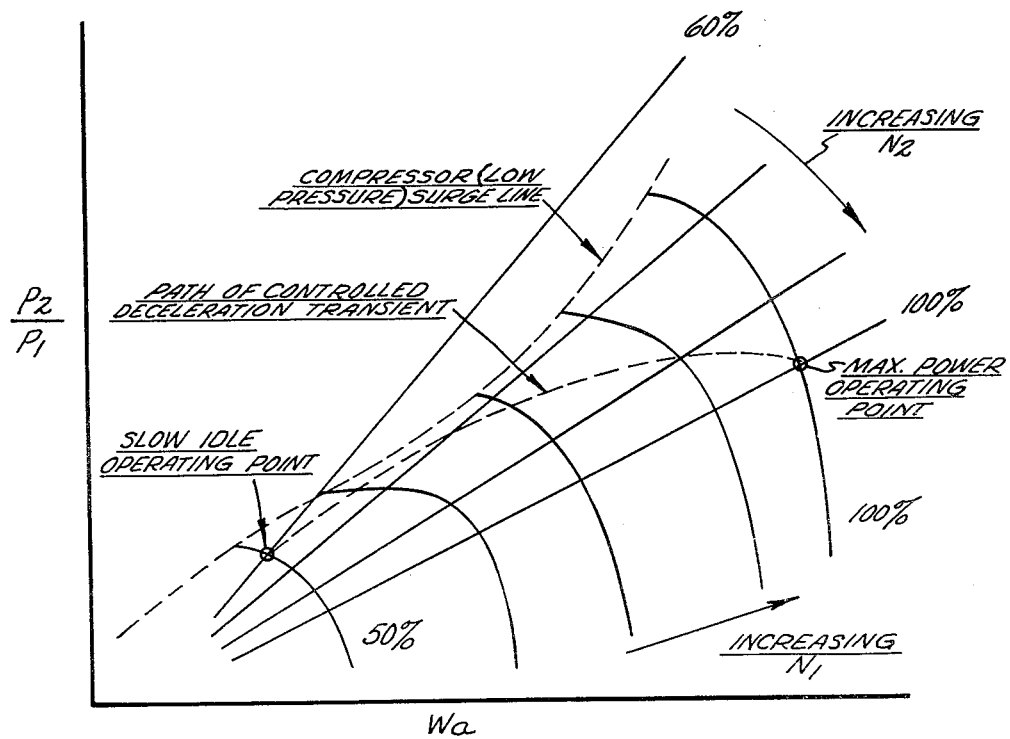
FIGS. 5–11 are diagrams of certain operating characteristics of the engine and control shown in FIGS. 1–4.

The $N_2$ governor dashpot 97–99 will retard, or cause a time delay, in the rate of reset of the $N_2$ speed, in the decelerating direction, to equalize the deceleration times of the two engine rotors and prevent low-pressure compressor surge, as indicated in FIGURE 11.

Retarding of the throttle 93 will, (as in the primary system) uncover bleed 158, reducing pressure $P_{R2'}$, and hence secondary fuel flow $W_{F_2}$. The $N_1$ speed will reset at a lower value, corresponding to the new lower selected throttle position, as dictated by the $P_2$ pressure.

As previously mentioned, the augmentation flow is not desired during engine deceleration because deceleration time will be increased. In accordance with this requirement, reduction of the throttle angle PLA will produce simultaneous opening of orifice 157, causing the high pressure signal to the augmentation valve 144 to be reduced (note orifice 141 in the line 140 to the augmentation valve). The augmentation valve 144 will then close during decelerations, remain closed during accelerations, and open only during $N_2$ governor cut-in.

The power turbine speed governor 211 operates to cut-in and reduce $N_2$ and $P_2$ settings simultaneously at the instant that power turbine set speed is exceeded. The centrifugal force generated by the spinning valve 219 is balanced by the pressure $P_{RPT}$ developed between orifices 171 and 178. The pressure $P_{RPT}$, acting on the diameter of the valve 219 in the control will, at the overspeed condition, cause an unbalance condition between the diaphragm spring 178 load and the pressure generated diaphragm 174 force. This unbalance will simultaneously uncover orifices 179, 180 and 181 to reduce primary and secondary metered fuel flows, and shut off the augmentation fuel flow. The relative rates of cutback of the primary and secondary fuel flows will be determined by selection of the diaphragm loading spring 178, diaphragm 174 size, and relative sizes of orifices 179, and 181. The loading spring 220 on the rotating valve 219 in the power turbine control has been included to insure that no leakage occurs during the cranking and starting of the engine.

The engine will be shutdown by turning off the ignition switch on valve 189 to simultaneously close both primary and secondary solenoid valves 49 and 132 and stop all fuel flow to the engine.

Both circuit pressurizing and check valves 50 and 133, which are mounted as close as possible to the engine nozzles, will prevent undue dribbling of fuel into the combustion chambers $B_1$ and $B_2$, and minimize coking of the nozzles therein. This might otherwise be a problem caused by long fuel lines slowly emptying into hot combustion chambers.

The control system case pressure ($P_c$) is maintained at essentially ambient pressure by connecting case 40 to the fuel tank 16 through a check valve 41. With the control case pressure $P_c$ fixed at an ambient reference, all hydraulic pressures computed in the control refer to this fixed reference, eliminating the need for balancing diaphragms.

The requirement of control operation submerged in deep water, such as may be called for in a tank type vehicle, will present no problem, since all ambient references, such as exposed bellows and/or diaphragms, have been eliminated. The only required ambient reference of the control will be a single line back to the fuel tank.

While we have shown and described the preferred embodiment of our invention, we desire it to be understood that we do not limit the invention to the precise construction and arrangement of elements disclosed by way of illustration, since these may be changed and modified by those skilled in the art without departing from the spirit of our invention or exceeding the scope of the appended claims.

We claim:

1. In operative association with a gas turbine engine, having a compressor supplying compressed air through a heat recuperator to a fuel combustion chamber, a fuel control comprising: means supplying fuel to said combustion chamber, at a rate varying in accordance with the mass rate of air flow thereto, and means for automatically modifying the rate of said fuel supply, in accordance with a function of the product of the compressor discharge pressure and the temperature of the air leaving said recuperator, so that the temperature of the gases leaving said combustion chamber never exceeds a preselected maximum limit.

2. In operative association with a gas turbine engine, having a compressor supplying compressed air through a heat recuperator to a fuel combustion chamber, means for discharging combustion gases generated in said chamber successively through said turbine and recuperator; a fuel control comprising: means supplying fuel to said combustion chamber, in accordance with the mass rate of air flow therethrough, and means for automatically modifying the rate of said fuel supply in accordance with the temperature of the air leaving said recuperator so as to compensate for the heat added to said air by said recuperator, whereby the temperature of the gases discharged from said combustion chamber into said turbine never exceeds a preselected maximum limit, including means for limiting the maximum fuel flow to said combustion chamber in accordance with the equation:

$$W_{F_1} = KP_2(T_4^* - T_3)$$

wherein ($W_{F_1}$) is the rate of said fuel flow, (K) is a preselected constant, ($P_2$) is the discharge pressure of said compressor, ($T_4^*$) is the preselected maximum permissible temperature of gases entering said turbine, and ($T_3$) is the temperature of the air leaving said recuperator.

3. A fuel control according to claim 2, having means for measuring the recuperator outlet air temperature ($T_3$), means for automatically substracting said temperature ($T_3$) from said maximum temperature $T_4^*$, means for automatically measuring said compressor discharge pressure ($P_2$), and computer means for mechanically multiplying the difference between said temperatures $$(T_4^* - T_3)$$

by said measured pressure ($P_2$).

4. A fuel control according to claim 3, having a positionable fuel metering valve for regulating the fuel flow ($W_{F_1}$), means for maintaining a constant pressure drop across said valve, means to vary the position of said valve, in accordance with the output of said computer means, and means to limit said fuel flow, in accordance with said equation, so that said turbine is protected from damage due to overtemperature.

5. A fuel control according to claim 4, wherein said engine comprises a first and a second gas turbine, said first turbine drives said compressor, and said second turbine is a free power turbine which delivers the power output of said engine; and means for passing the gases discharged by said first turbine successively through said second turbine and said recuperator, so that the heat of the gases passing through said recuperator is utilized to heat the compressed air passing through said recuperator.

6. A fuel control according to claim 5, having a positionable manual power control lever, and a speed governor driven by said first turbine, for regulating the speed ($N_2$) of said first turbine, means for modifying the action of said governor in accordance with the temperature ($T_1$) of the air entering said compressor and the angular position of said manual control lever; means for rendering said governor inoperative when the control is limiting said fuel flow ($W_{F_1}$) in accordance with said equation; and means for cutting in said governor when the corrected speed ($N_2/\sqrt{T_1}$) of said first turbine attains a value for which said manual lever is set, so that said set speed is maintained under varying operating conditions.

7. A control according to claim 6, having means for controlling the corrected speed ($N_2/\sqrt{T_1}$) of said first turbine, so that the torque (Q) exerted by said second turbine is a single-valued function of said corrected speed, whereby the maximum value of said torque (Q) is limited by a selected maximum value of said corrected speed.

8. In operative association with a gas turbine engine, comprising: a first, low-pressure air compressor driven by a first gas turbine, a second, high-pressure air compressor, diven by a second gas turbine, for supplying compressed air through a heat recuperator to a first fuel combustion chamber, a third, free-power turbine, interposed in gas flow series relation between said first and second turbines, for generating the power output of said engine, and a second fuel combustion chamber, interposed in gas flow series relation between said second and third turbines; a single-unit fuel control comprising: means for coordinately regulating fuel flow from a common supply source to said first and second combustion chambers, in accordance with the rate of mass air flow through said engine, and means for automatically modifying the fuel flow to said first combustion chamber, in accordance with the temperature of the air leaving said recuperator, so that the temperature of the gases leaving said first combustion chamber never exceeds a preselected maximum limit, including means for limiting the maximum fuel flow to said first combustion chamber in accordance with the equation:

$$W_{F_1} = KP_2(T_4^* - T_3)$$

wherein ($W_{F_1}$) is the rate of said fuel flow, (K) is a preselected constant, ($P_2$) is the discharge pressure of said second compressor, ($T_4^*$) is the preselected maximum permissible temperature of gases entering said second gas turbine, and ($T_3$) is the temperature of the air leaving said recuperator.

9. A control according to claim 8, including means, responsive to the temperature ($T_1$) of the air entering said first compressor, for automatically correcting said fuel flow to the first combustion chamber for each particular ($T_1$) temperature condition, so as to provide the desired steady-state operation of the engine, at optimum fuel consumption rates and optimum temperature condition in said recuperator, without encounting compressor surge and turbine overtemperature.

10. A fuel control according to claim 9, having means for measuring the recuperator outlet air temperature ($T_3$), means for automatically substracting said temperature ($T_3$) from said maximum temperature $T_4^*$, means for automatically measuring said compressor discharge pressure ($P_2$), and computer means for mechanically multiplying the difference between said temperatures, $$(T_4^* - T_3)$$

by said measured pressure ($P_2$).

11. A fuel control according to claim 10, having a positionable fuel metering valve for regulating the fuel flow ($W_{F_1}$) to said first combustion chamber, means for maintaining a constant pressure drop across said valve, means to vary the position of said valve in accordance with the output of said computer means, and means to limit said fuel flow, in accordance with said equation, so that said gas turbine is protected from damage due to overtemperature.

12. A fuel control according to claim 11, having a positionable, manual power control lever, and a speed governor driven by said second turbine, for regulating the speed ($N_2$) of said second turbine, means for modifying the action of said governor in accordance with the temperature ($T_1$) of the air entering said first compressor and the angular position of said manual control lever; means for rendering said governor inoperative when the control is limting said fuel flow ($W_{F_1}$) in accordance with said equation; and means for cutting in said governor when the corrected speed ($N_2/\sqrt{T_1}$) of said second turbine attains a value for which said manual lever is set, so that said set speed is maintained under varying operating conditions.

13. A control according to claim 12, having means for controlling the corrected speed ($N_2/\sqrt{T_1}$) of said second turbine so that the torque (Q) exerted by said free power turbine is a single-valued function of said corrected speed, whereby the maximum value of said torque (Q) is limited by a selected maximum value of said corrected speed.

14. In operative association with a gas turbine engine, comprising: a first, low-pressure air compressor, driven by a first gas turbine; a second, high-pressure air compressor, driven by a second gas turbine; for supplying compressed air through a heat recuperator to a first fuel combustion chamber; and a second fuel combustion chamber, interposed in gas flow series relation between said first and second turbines; a single-unit fuel control, comprising: a manual power control lever, means for coordinately regulating fuel flow from a common supply source to said first and second combustion chambers, so as to maintain the ratio between the corrected speeds of said first and second compressor rotors at a selected definite value, for each particular position of said lever, so that for each lever position a selected value of second compressor rotor speed, and a corresponding steady-state discharge pressure of said first compressor, is obtained, under varying operating conditions; the corrected speed of each of said rotors being defined as its actual speed (N), divided by the square root of the temperature ($T_1$) of the air entering its compressor.

15. A fuel control as in claim 14, wherein said control includes means for modifying the fuel flow to said first combustion chamber, in accordance with the temperature of the air leaving said recuperator, so as to achieve optimum fuel consumption rates, during engine steady-state operation, without encountering compressor surge and turbine overtemperature.

16. A fuel control as in claim 15, wherein said engine also comprises a free power turbine for delivering the power output of said engine, and said control comprises means, responsive to the temperature ($T_1$) of the air entering said first compressor, for automatically controlling the corrected speed of said second gas turbine, so that the torque exerted by said free power turbine is independent of said ($T_1$) temperature.

17. A fuel control as in claim 15, wherein said control include means for obtaining maximum acceleration of the engine from one manual power lever setting to another, without causing compressor surge and engine overtemperature.

18. A fuel control as in claim 15, wherein said fuel control comprises means for modifying the fuel flow to said first combustion chamber, so as to obtain maximum engine deceleration from any manual power lever setting to any lower setting, without causing burner blowout.

19. A fuel control as in claim 15, wherein said control comprises means to automatically compensate the fuel flow to said first combustion chamber, for variations in the temperature and pressure of the air entering said first compressor, and for changes in temperature conditions in said recuperator.

20. A fuel control as in claim 15, wherein the fuel supply to the engine comprises a primary fuel supply system for supplying fuel to the first combustion chamber, and a secondary fuel supply system for supplying fuel to the second combustion chamber to supplement said primary fuel supply; each system comprising a plurality of component, coordinated hydraulic devices, arranged therein in fuel flow series relation, and subject to the manual power control lever, for regulating the fuel flow therethrough to the engine; said devices in each system being collectively responsive respectively to the corrected speed and corrected fuel flow through its system; corrected speed being the actual speed of a compressor rotor divided by the square root of the temperature of the air entering said compressor; and corrected fuel flow being the actual fuel flow to the related combustion chamber, multiplied by the pressure of the air entering the compressor supplying air to said chamber, and divided by the square root of the temperature of said air.

21. A fuel control as in claim 20, wherein the primary fuel system comprises a series of coordinated devices that collectively measure low-pressure compressor inlet air absolute temperature, high-pressure compressor discharge pressure, recuperator discharge temperature, and engine speed (r.p.m.); and position a primary fuel metering valve, in accordance with a preselected, composite function of said temperatures, pressure and speed, while the pressure drop across said valve is maintained at a constant selected value.

22. A fuel control as in claim 21, including override engine speed and temperature control devices, which modify the fuel flow to the engine, so as to prevent the engine operating at excessive speeds and temperature.

23. In operative association with a two-spool, gas turbine engine, comprising: a first rotor, consisting of a low pressure air compressor driven by a first gas turbine; a second rotor, consisting of a high pressure air compressor driven by a second gas turbine; said compressors supplying compressed air through a heat recuperator to a first fuel combustion chamber; and a second fuel combustion chamber; interposed in gas flow series relation between said first and second turbines; a single-unit fuel control, comprising: a positive displacement pump driven by the engine, for supplying fuel from a source to said first combustion chamber, through a primary fuel metering and control system; and a secondary fuel metering and control system, in parallel with said primary system, for supplying fuel from said pump to said second combustion chamber; and a single, power lever mechanism for setting the desired combination of high-pressure rotor speed and low-pressure rotor discharge pressure, so as to obtain a desired ratio between the speeds of said first and second rotors.

24. A fuel control as in claim 23, wherein said engine also comprises a free power turbine, interposed in gas flow relation between said second and first gas turbines, for delivering the power output of said engine; and said fuel control includes a speed governor for said free power turbine which reduces both primary and secondary fuel flows to the engine as a function of said power turbine speed error.

25. A fuel control as in claim 23, which also comprises means for modifying the primary fuel flow, in accordance with variations in recuperator gas temperature, so that primary acceleration fuel flow is proportional to the product of a function of high-pressure compressor discharge pressure times a function of recuperator gas temperature.

26. A fuel control as in claim 23, which also comprises means for selecting the desired high-pressure rotor speed, and means for biasing said selecting means, in accordance with inlet air temperature of the low-pressure compressor, so that the desired speed of the high-pressure rotor is essentially the corrected speed ($N_2/\sqrt{T_1}$) of said rotor.

27. A fuel control as in claim 23, which also comprises time delay means for retarding the deceleration of the high-pressure rotor when the manual power lever is moved in a speed reducing direction.

28. A fuel control as in claim 23, including means for selecting a desired low-pressure rotor air pressure, and means responsive to the temperature of the air entering the low-pressure compressor, for biasing said selecting means, so that the desired speed of the low-pressure rotor is essentially the corrected speed ($N_1/\sqrt{T_1}$) of said rotor.

29. In operative association with a two-spool, gas turbine, engine comprising: a low-pressure air compressor ($C_1$), driven by a secondary gas turbine ($T_{b_1}$), constituting an outer spool, arranged in air flow series relation with a high-pressure air compressor ($C_2$), driven by a primary gas turbine ($T_{b_2}$), constituting an inner spool; a free power turbine (PT), interposed in gas flow relation between said primary and secondary turbines, for delivering the power output of said engine; a primary combustion chamber ($B_1$), receiving compressed air from high-pressure compressor ($C_2$), supplied with fuel from a fuel source, and discharging combustion gases into said primary turbine ($T_{b_1}$); a secondary combustion chamber ($B_2$), receiving exhaust gases from said primary turbine ($T_{b_2}$), supplied with fuel from said source, and discharging exhaust gases into said free power turbine (PT); a fuel control comprising: a manual power control lever, and means for coordinately regulating the fuel flow ($W_{F_1}$) to said primary combustion chamber ($B_1$), and the fuel flow ($W_{F_2}$) to said secondary combustion chamber ($B_2$); so as to maintain a selected ratio of corrected speeds of said two spools, at a definite value, for each particular selected position of said power control lever; said corrected speed being defined as the actual speed (N) of each rotor, divided by the square root of the temperature ($T_1$) of the air entering its compressor.

30. A fuel control according to claim 29, wherein said engine comprises a recuperator, interposed in air-flow series relation, between said high-pressure compressor ($C_2$) and said primary combustion chamber ($B_1$); and said fuel control comprises means for modifying the fuel flow ($W_{F_1}$) to said primary combustion chamber ($B_1$), in accordance with the temperature ($T_6$) of the air discharged from said recuperator into said primary combustion chamber, so that the temperature ($T_7$) of the gases discharged from said combustion chamber ($B_1$) into said primary turbine ($T_{b_1}$) never exceeds a preselected safe value.

31. A fuel control according to claim 30, having means for selecting, for each position of said lever, a given value of high-pressure rotor speed ($N_2$), along with a corresponding steady-state discharge pressure ($P_2$) of the low-pressure compressor ($C_1$), so as to obtain a selected ratio between the speeds of said compressors, under varying operating conditions.

References Cited by the Examiner

UNITED STATES PATENTS

| | | | |
|---|---|---|---|
| 2,651,911 | 9/53 | Sterland | 60—39.17 |
| 2,683,485 | 7/54 | Harris | 60—39.28 |
| 2,857,739 | 10/58 | Wright | 60—39.28 |
| 2,939,280 | 6/60 | Farkas | 60—39.28 |
| 2,943,447 | 7/60 | Davies | 60—39.28 |
| 2,971,339 | 2/61 | Gold | 60—39.28 |
| 3,022,629 | 2/62 | Colley | 60—39.16 |
| 3,108,435 | 10/63 | Chandler | 60—39.28 |

FOREIGN PATENTS 620,983   4/49   Great Britain.

SAMUEL LEVINE, *Primary Examiner.*